(12) United States Patent
Elahmadi et al.

(10) Patent No.: US 10,009,108 B2
(45) Date of Patent: Jun. 26, 2018

(54) COHERENT AND PULSE AMPLITUDE MODULATION IN A PLUGGABLE OPTICAL TRANSCEIVER

(71) Applicant: Menara Networks, Inc., Dallas, TX (US)

(72) Inventors: Salam Elahmadi, Dallas, TX (US); Siraj Nour Elahmadi, Dallas, TX (US); George H. Buabbud, Shrewsbury, MN (US); Gabriel E. Cardona, Richardson, TX (US); Qingzhong Cai, Dallas, TX (US); Qing Zhang, Dallas, TX (US); Barry Coles, Plano, TX (US)

(73) Assignee: Menara Networks, Inc., Dallas, TX (US)

( * ) Notice: Subject to any disclaimer, the term of this patent is extended or adjusted under 35 U.S.C. 154(b) by 0 days. days.

(21) Appl. No.: 15/263,957

(22) Filed: Sep. 13, 2016

(65) Prior Publication Data

US 2016/0380698 A1    Dec. 29, 2016

Related U.S. Application Data

(63) Continuation-in-part of application No. 15/077,244, filed on Mar. 22, 2016, and a continuation-in-part of
(Continued)

(51) Int. Cl.
*H04B 10/516* (2013.01)
*H04B 10/40* (2013.01)
(Continued)

(52) U.S. Cl.
CPC .............. *H04B 10/40* (2013.01); *G02B 6/00* (2013.01); *H04L 1/004* (2013.01)

(58) Field of Classification Search
CPC .................................................. H04B 10/5161
See application file for complete search history.

(56) References Cited

U.S. PATENT DOCUMENTS 7,106,968 B2   9/2006 Lahav et al.
7,286,762 B2   10/2007 Elahmadi et al.
(Continued)

FOREIGN PATENT DOCUMENTS

CN   101662335 B   6/2013

OTHER PUBLICATIONS

Mark Telford; Shrinking Transceivers Drive InP Integration; Technical Feature—InP Circuit Integration—PCT/US2007/008848 Apr. 4, 2008; III-Vs Review the Advanced Semiconductor Magazine; vol. 16—No. 5, Jun./Jul. 2003.
(Continued)

*Primary Examiner* — Shi K Li
(74) *Attorney, Agent, or Firm* — Clements Bernard Walker PLLC; Lawrence A. Baratta, Jr.

(57) ABSTRACT

An apparatus adapted to operate a pluggable optical transceiver in a plurality of modulation schemes includes core circuitry adapted to interface with a host device, wherein the host device is adapted to support the pluggable optical transceiver; direct detection modulation circuitry communicatively coupled to the core circuitry; coherent modulation circuitry communicatively coupled to the core circuitry; and selection circuitry adapted to operate one of the direct detection modulation circuitry and the coherent modulation circuitry based on a selection depending on an application of the pluggable optical transceiver.

18 Claims, 13 Drawing Sheets

Related U.S. Application Data application No. 14/854,674, filed on Sep. 15, 2015, now Pat. No. 9,496,960, which is a continuation of application No. 14/589,635, filed on Jan. 5, 2015, now Pat. No. 9,319,143, which is a continuation-in-part of application No. 13/784,998, filed on Mar. 5, 2013, now Pat. No. 8,929,744, which is a continuation-in-part of application No. 13/025,947, filed on Feb. 11, 2011, now Pat. No. 8,412,051.

(51) Int. Cl.
  *G02B 6/00* (2006.01)
  *H04L 1/00* (2006.01)

(56) References Cited

U.S. PATENT DOCUMENTS

| | | | |
|---|---|---|---|
| 7,941,053 B2 | 5/2011 | Dallesasse | |
| 7,995,927 B2 | 8/2011 | Aronson et al. | |
| 8,155,519 B2 | 4/2012 | Sheth et al. | |
| 8,249,447 B2 | 8/2012 | Cai et al. | |
| 2003/0123493 A1 | 7/2003 | Takahashi | |
| 2003/0215243 A1 | 11/2003 | Booth | |
| 2004/0030965 A1 | 2/2004 | Hadjihassan et al. | |
| 2004/0033079 A1 | 2/2004 | Sheth et al. | |
| 2004/0114924 A1 | 6/2004 | Holness et al. | |
| 2004/0159776 A1 | 8/2004 | Richard et al. | |
| 2005/0063711 A1 | 3/2005 | Rossi et al. | |
| 2006/0093379 A1 | 5/2006 | Aronson | |
| 2007/0122148 A1 | 5/2007 | Welch et al. | |
| 2008/0050074 A1 | 2/2008 | Dallesasse et al. | |
| 2008/0089693 A1 | 4/2008 | El-Ahmadi et al. | |
| 2008/0095541 A1 | 4/2008 | Dallesasse | |
| 2009/0269076 A1* | 10/2009 | Cai | H04B 10/695 398/135 |
| 2010/0061069 A1* | 3/2010 | Cole | G02B 6/4284 361/761 |
| 2011/0013911 A1 | 1/2011 | Alexander et al. | |
| 2012/0269511 A1* | 10/2012 | Calderon | H04J 3/1664 398/58 |
| 2015/0086211 A1* | 3/2015 | Coffey | H04B 10/40 398/116 |
| 2015/0372762 A1* | 12/2015 | Zhang | H04B 10/5161 398/26 |
| 2016/0036530 A1* | 2/2016 | Yamamoto | H04B 10/564 398/1 |
| 2016/0099776 A1* | 4/2016 | Nakashima | H04B 10/50572 398/186 |

OTHER PUBLICATIONS

Kazuhiko Terada, Kenji Kawai, Osamu Ishida, Keiji Kishine, Nobaru Iwasaki and Haruhiko Ichino; Physical Layer OAM&P Signaling Method for 10 Gbit/s Ethernet Transport over Optical Networks; Paper; IEICE Trans. Commun., vol. E 88 8, No. 10, Oct. 2005.
Optical PMD Overview, Tutorial T1A: 40/100GbE: What's Happening?, Chris Cole.
CFP MSA Hardware Specification, Revision 1.4, Jun. 7, 2010.
100Gb/s Clients: ECOC 100Gb/s Workshop 5, Sep. 20, 2009, Chris Cole.
SFF-836 QSFP+, SFF Committee, INF-8438i Specification for QSFP (Quad Small Formfactor Pluggable) Transceiver, Rev. 1.0, Nov. 2006.
OIF Multisource Agreement for 100G Long-Haul DWDM Transmission Module—Electromechanical IA # OIF-MSA-100GLH-EM-01.0, Jun. 8, 2010.
MSA Group Members; A Cooperation Agreement for 10 Gigabit Ethernet Transceiver Package; Issue 3.0, Sep. 18, 2002; XENPAK MSA.
MSA Group Members; A Cooperation Agreement for a Small Versatile 10 Gigabit Transceiver Package—Issue 2.0b, Apr. 7, 2005; X2 MSA, ZENPAK MSA.
Simon Stanley; 10-Gbit/s Ethernet Components—Session 11, 10-Gig Ethernet Transponders; Driving Growth in the Enterprise Presentation; Aug. 17, 2004.
SFF Committee, INF-8077i, 10 Gigabit Small Form Factor Pluggable Module. Revision 4.5 Aug. 31, 2005.
CFP MSA, Avago Technologies, Finisar Corp., Fujitsu Optical Components, Opnext, Inc., Sumitomo Electric Industries Next Gen PMD CFP MSA Baseline Specifications; Jul. 22, 2011.
CFP MSA, CFP2 Hardware Specification, Draft Revision 0.3, May 2, 2013.
EA Panel Moderator, Daniel Dove—Applied Micro, Ethernet Alliance, 4X25G Optical Modules and Future Optics, ECOC 2012—Amsterdam.
SFF Committee, SFF-8665, Specification for QSFP+ 28 GB/s 4X Pluggable Transceiver Solution (QSFP28), Rev 1.9, Jun. 29, 2015.

\* cited by examiner

COHERENT AND PULSE AMPLITUDE MODULATION IN A PLUGGABLE OPTICAL TRANSCEIVER

CROSS-REFERENCE TO RELATED APPLICATIONS

The present patent/application is a continuation-in-part of co-pending U.S. patent application Ser. No. 15/077,244 filed on Mar. 22, 2016, and entitled "PLUGGABLE OPTICAL TRANSCEIVER INTERFACE MODULE" and of co-pending U.S. patent application Ser. No. 14/854,674 filed on Sep. 15, 2015, and entitled "PLUGGABLE OPTICAL TRANSCEIVERS WITH INTEGRATED ELECTRONIC DISPERSION COMPENSATION, which claims priority to U.S. Pat. No. 9,319,143 issued on Apr. 19, 2016, and entitled "40G/100G/200G/400G PLUGGABLE OPTICAL TRANSCEIVERS WITH ADVANCED FUNCTIONALITY," which claims priority as a continuation-in-part of U.S. Pat. No. 8,929,744 issued on Jan. 6, 2015, and entitled "40G/100G MSA-COMPLIANT OPTICAL TRANSCEIVERS WITH ADVANCED FUNCTIONALITY," which claims priority as a continuation-in-part of U.S. Pat. No. 8,412,051, issued on Apr. 2, 2013, and entitled "40G/100G OPTICAL TRANSCEIVERS WITH INTEGRATED FRAMING AND FORWARD ERROR CORRECTION," the contents of each are incorporated by reference.

FIELD OF THE DISCLOSURE

The present disclosure relates generally to optical and data networking systems and methods. More particularly, the present disclosure relates to coherent and Pulse Amplitude Modulation (PAM) circuitry for a pluggable optical transceiver module and for a pluggable optical transceiver interface module.

BACKGROUND OF THE DISCLOSURE

Optical transceivers can be defined by multi-source agreements (MSAs) or equivalents. MSAs are agreements for specifications of optical transceivers agreed to by multiple vendors, organizations, etc. and promulgated for other vendors and network operators to utilize. MSAs allow other vendors to design transceivers to the same specifications reducing the risk for vendors and operators, increasing flexibility, and accelerating the introduction of new technology. Exemplary MSAs include XFP, XPAK, XENPAK, X2, XFP-E, SFP, SFP+, and 300-pin. Exemplary MSAs for 40G, 100G, 200G, and 400G include CFP and variants thereof (e.g., CFP2, CFP4, CXP), CDFP and variants thereof (e.g., CDFP2, CDFP4, etc.), OIF-MSA-100GLH-EM-01.0— Multisource Agreement for 100G Long-Haul DWDM Transmission Module—Electromechanical (June 2010) (hereinafter MSA-100GLH), CCRx (Compact Coherent Receiver), Quad Small Form-factor Pluggable (QSFP) and variants thereof (e.g., QSFP+, QSFP2, QSFP28), 10×10 MSA, and the like. Additionally, new MSAs are emerging to address new services, applications, and advanced technology. Each MSA defines the transceiver's mechanical characteristics, management interfaces, electrical characteristics, optical characteristics, and thermal requirements. Because of MSA specifications, MSA-compliant optical transceivers are standardized among equipment vendors and network operators to support multiple sources for optical transceivers and interoperability. As such, MSA-compliant optical transceivers have become the dominant form of optical transmitters and receivers in the industry finding widespread acceptance over proprietary implementations.

Advantageously, MSA-compliant optical transceivers ensure engineering re-use and compatibility between various applications and the physical media dependent (PMD) transceivers. Further, equipment vendors realize streamlined manufacturing and inventory control by removing wavelength specific decisions from the manufacturing process. For example, all line cards are manufactured the same, and the optical transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted optical transceivers to reduce sparing costs. Further, significant cost reductions are realized by MSA standardization of optical transceivers because of multiple independent manufacturing sources. The MSA specifications tightly define the mechanical characteristics, management interfaces, electrical characteristics, optical characteristics, and thermal requirements of optical transceivers. Advantageously, this enables interoperability among equipment vendors of optical transceivers, i.e. any MSA-compatible optical transceiver can be used in any host system designed to the MSA specification; however, these tightly defined characteristics limit the performance of optical transceivers since the MSA specifications were designed to maximize density and minimize cost, and not to provide advanced optical performance or other integrated functions.

New and emerging MSAs are continuously being developed, with more and more functionality. Further, similarly sized MSAs are being provided for different applications, such as XENPAK and XFP; CFP2 and QSFP28; and the like. This leads to vendors having to produce different form factors with the same functionality and operators having to procure, spare, and manage the different form factors. It would be advantageous to reduce the number of modules and sparing requirements, both from a design and manufacturing perspective and from an operation perspective.

Further, the same MSA compatible module may be used in various different applications ranging from short reach intra-office interconnect to long reach connections of 100 s of kilometers. Conventionally, from a supplier perspective, different modules all compatible with the same MSA have to be produced to address the different applications. Conversely, from an operator perspective, the same number different modules must be procured, spared, etc. Thus, similar to above, it would be advantageous to increase the application support for the same module to address the aforementioned limitations.

BRIEF SUMMARY OF THE DISCLOSURE

In an exemplary embodiment, an apparatus adapted to operate a pluggable optical transceiver in a plurality of modulation schemes includes core circuitry adapted to interface with a host device, wherein the host device is adapted to support the pluggable optical transceiver; direct detection modulation circuitry communicatively coupled to the core circuitry; coherent modulation circuitry communicatively coupled to the core circuitry; and selection circuitry adapted to operate one of the direct detection modulation circuitry and the coherent modulation circuitry based on a selection depending on an application of the pluggable optical transceiver. The direct detection modulation circuitry can utilize Pulse Amplitude Modulation (PAM), and the coherent modulation circuitry can utilize Quadrature Amplitude Modulation (QAM). The PAM can be one of PAM4 and PAM16, and the QAM can be QAM64, and wherein the application can be based on a reach of the pluggable optical transceiver. The direct detection modulation circuitry can include a transmitter Digital Signal Processor (DSP) and a receiver DSP, and wherein the coherent modulation circuitry can include a Quadrature Amplitude Modulation (QAM) generator and a QAM decoder and coherent DSP. Either of the direct detection modulation circuitry and the coherent modulation circuitry can be configured to format signals for polarization multiplexing on dual polarizations. The core circuitry can be adapted to perform a plurality of framing; Forward Error Correction; and Operations, Administration, Maintenance, and Provisioning (OAM&P).

The apparatus can further include first interface circuitry between the core circuitry and the host device, wherein the first interface circuitry can include on a transmit side, a plurality of Clock and Data Recovery (CDR) circuits; and, on a receive side, a plurality of Clock Multiplier Unit (CMU) circuits; and second interface circuitry between the direct detection modulation circuitry and the coherent modulation circuitry and optical interfaces of the pluggable optical transceiver, wherein the second interface circuitry can include, on the transmit side, a plurality of digital to analog converters; and, on the receive side, a plurality of analog to digital converters. The pluggable optical transceiver can be compliant to a Multi-Source Agreement, and the apparatus can be disposed within the pluggable optical transceiver, independent of the Multi-Source Agreement. The pluggable optical transceiver can be compliant to a first Multi-Source Agreement and is operated in an interface module compliant to a second Multi-Source Agreement, and wherein the apparatus can be disposed within the interface module, independent of either of the first Multi-Source Agreement and the second Multi-Source Agreement. The pluggable optical transceiver can be one of a variant of CFP and a variant of QSFP.

In another exemplary embodiment, a pluggable optical transceiver adapted to operate a plurality of modulation schemes includes optical interfaces; interface circuitry coupled a host device; and core circuitry coupled to the optical interfaces and the interface circuitry, wherein the core circuitry is adapted to interface with the host device through the interface circuitry; provide formatting for signals provided to and received from the optical interfaces for either direct detection modulation and coherent modulation, based on selection depending on an application of the pluggable optical transceiver; and interface with the optical interfaces with the formatted signals. The direct detection modulation can be Pulse Amplitude Modulation (PAM) and the coherent modulation can be Quadrature Amplitude Modulation (QAM). The PAM can be one of PAM4 and PAM16 and the QAM can be QAM64, and wherein the application can be based on a reach of the pluggable optical transceiver. The direct detection modulation can utilize a transmitter Digital Signal Processor (DSP) and a receiver DSP, and wherein the coherent modulation can utilize a Quadrature Amplitude Modulation (QAM) generator and a QAM decoder and coherent DSP. Either of the direct detection modulation and the coherent modulation can further utilize polarization multiplexing on dual polarizations. The core circuitry can be further adapted to perform a plurality of framing; Forward Error Correction; and Operations, Administration, Maintenance, and Provisioning (OAM&P).

The interface circuitry can include first interface circuitry between the core circuitry and the host device, wherein the first interface circuitry can include, on a transmit side, a plurality of Clock and Data Recovery (CDR) circuits; and, on a receive side, a plurality of Clock Multiplier Unit (CMU) circuits; and second interface circuitry between the core circuitry and the optical interfaces, wherein the second interface circuitry can include, on the transmit side, a plurality of digital to analog converters; and, on the receive side, a plurality of analog to digital converters. The pluggable optical transceiver can be compliant to a Multi-Source Agreement, and the apparatus can be disposed within the pluggable optical transceiver, independent of the Multi-Source Agreement. The pluggable optical transceiver can be compliant to a first Multi-Source Agreement and can be operated in an interface module compliant to a second Multi-Source Agreement, and wherein the apparatus can be disposed within the interface module, independent of either of the first Multi-Source Agreement and the second Multi-Source Agreement.

In a further exemplary embodiment, a method for operating a pluggable optical transceiver in a plurality of modulation schemes includes interfacing with a host device with signals therebetween; formatting the signals for one of direct detection modulation and coherent modulation, based on selection depending on an application of the pluggable optical transceiver; interfacing with optical interfaces with the formatted signals from optical transmission and reception thereof, wherein the pluggable optical transceiver is compliant to a Multi-Source Agreement.

BRIEF DESCRIPTION OF THE DRAWINGS

The present disclosure is illustrated and described herein with reference to the various drawings of exemplary embodiments, in which like reference numbers denote like method steps and/or system components, respectively, and in which.

DETAILED DESCRIPTION OF THE DISCLOSURE

Figure 1:
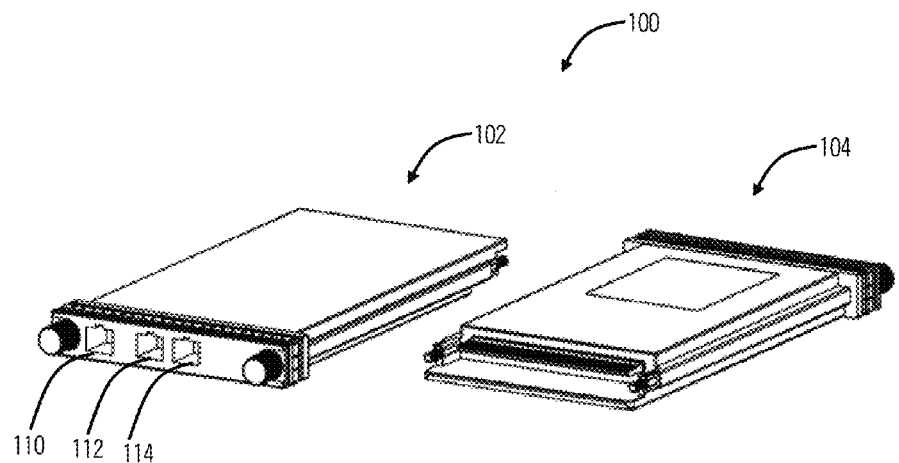
FIG. 1 is a perspective view a CFP module.

In various exemplary embodiments, the present disclosure relates to coherent and Pulse Amplitude Modulation (PAM) circuitry for a pluggable optical transceiver interface. Specifically, the circuitry supports programmability in a pluggable module, such as CFP2, CFP4, QSFP28, etc. selectively to support various PAM configurations (amplitude modulation, direct detection) and coherent modulation configurations (Quadrature Amplitude Modulation (QAM). Thus, the circuitry allows a pluggable module to support different applications with the same module. Advantageously, suppliers can source a single module for various applications while operators can procure the same single module for the various applications, leading to manufacturing optimization, sparing reduction, and the like.

Further, in various exemplary embodiments, the present disclosure relates to a pluggable optical transceiver module and method which adapts one Multi-Source Agreement (MSA) compliant optical transceiver to support another type of MSA, e.g., an XFP in a XENPAK, a QSFP28 in a CFP2 or CFP4, a CFP4 in a CFP2 or CFP, etc. That is, the interface module and method provides a first module supporting a set of functionality. The first module can be compliant to an MSA, such as an XFP, QSFP28, etc. The first module can be inserted and housed in the interface module to form a second module that is compliant to a different MSA. For example, an XFP module can be housed in an interface module to form an XENPAK module or a QSFP28 module can be housed in the interface module to form a CFP2, CFP, or CFP4 module. Thus, the interface module serves as an MSA converter. In another exemplary embodiment, the first module may not be a pluggable transceiver, but rather a subsystem with optical interfaces that is inserted into the interface module to form a desired MSA compliant transceiver.

Thus, the first module includes the optical interfaces, electrical circuitry, and the like to provide optical transceiver functionality, including, e.g., tunable wavelengths, framing, Forward Error Correction, and OAM&P processing, i.e., advanced functionality. The interface module is configured to adapt the first module to support a plurality of different MSA specifications. The interface module is configured to bridge the first module to support a specific MSA, namely providing connector conversion, timing adjustments, host interface adjustments, etc.

Advantageously, the interface module allows for streamlined design and manufacturing of advanced pluggable transceivers. Vendors can simply manufacture one set of first modules, i.e., no requirements for a different module for each MSA specification. In turn, operators can use the first modules with associated interface modules as required for specific applications. From a product design and manufacturing perspective, the interface module is relatively low cost and complexity with the advanced functionality focused on the first module.

Also, in various exemplary embodiments, the present disclosure provides integrated performance monitoring (PM); optical layer operations, administration, maintenance, and provisioning (OAM&P); alarming; and other advanced functionality in optical transceivers, such as multi-source agreement (MSA)-defined modules. The present disclosure provides an optical transceiver defined by an MSA agreement with integrated PM and alarming for carrier-grade operation. The integration preserves the existing MSA specifications allowing the optical transceiver to operate with any compliant MSA host device. Further, the host device can be configured through software to retrieve the PM and alarming from the optical transceiver. The optical transceiver can include CFP and variants thereof (e.g., CFP2, CFP4, CXP), CDFP and variants thereof (e.g., CDFP2, CDFP4, etc.), MSA-100GLH, CCRx, QSFP and variants thereof (e.g., future QSFP+, QSFP2), 10×10, XFP, XPAK, XENPAK, X2, XFP-E, SFP, SFP+, 300-pin, and the like.

MSA Modules

Referring to FIG. 1, in an exemplary embodiment, a perspective diagram illustrates a CFP module 100 in a front view 102 and a rear view 104. The present disclosure can incorporate the integrated functionality described herein in 40 Gb/s and 100 Gb/s optical transceivers such as CFP and variants thereof (e.g., CFP2, CFP4, CXP), CDFP and variants thereof (e.g., CDFP2, CDFP4, etc.), MSA-100GLH, CCRx, QSFP and variants thereof (e.g., QSFP+, QSFP2), 10×10, and the like. The CFP module 100 is compliant to the CFP MSA Rev. 1.4 (June 2010) (available at www.cfp-msa.org and incorporated by reference herein). The CFP MSA defines a hot-pluggable optical transceiver form factor to enable 40 Gb/s and 100 Gb/s applications, including next-generation High Speed Ethernet (40 GbE and 100 GbE). The electrical interface may include a nominal signaling lane rate is 10 Gbit/s per lane with various electrical interface specifications such as CAUI, XLAUI, OTL4.10, OTL3.4, and STL256.4. Other variants of CFP may include CFP2 which uses a signaling lane rate of 25 Gbit/s per lane or CFP4 which uses a signaling lane of 100G. For example, the CFP MSA has an electrical interface of 4×10G (XLAUI) or 10×10G (CAUI), the CFP2 MSA has an electrical interface of 4×25G (CAUI2 or CPPI2). Another variant of CFP may include CDFP which uses a signaling lane rate of 25 Gbit/s per lane and has an electrical interface of 16×25G providing 400G. The CXP MSA was created to satisfy the high-density requirements of the data center, targeting parallel interconnections for 12×QDR InfiniBand (120 Gbps), 100 GbE, and proprietary links between systems collocated in the same facility. The InfiniBand Trade Association (www.infinibandta.org) is currently standardizing the CXP. The CXP is 45 mm in length and 27 mm in width, making it slightly larger than an XFP. It includes 12 transmit and 12 receive channels in its compact package.

The OIF MSA-100GLH Multisource Agreement (IA) provides a 100G Long-Haul DWDM Transmission Module—Electromechanical (MSA-100GLH) for optical line interface applications. The OIF MSA-100GLH (available at www.oiforum.com/public/documents/OIF-MSA-100GLH-EM-01.0.pdf) specifically addresses 100G Polarization Multiplexed Quadrature Phase Shift Keying (PM-QPSK) long-haul DWDM, but the MSA strives to remain modulation format and data rate agnostic whenever practical to maximize applicability to future market requirements. The interface IC(s) and module electrical interface are generically specified to allow vendor specific customization of multilane "M-lane"~11 Gbit/s interfaces. Module electrical interfaces include but are not limited to the following: a) Simple bit multiplex; b) OTL4.10 [I2]; c) SFI-S [I3]; and d) OTL3.4 [I2] (for 40G applications). The QSFP MSA and variants (QSFP+, QSFP2, etc.) defines electrical interfaces, management interfaces, optical interfaces, mechanical specifications and the like for a multimode laser providing 40G and 100G clients. Specifically, QSFP provides four electrical interfaces at 10G (XLPPI) and four optical interfaces at 10G. QSFP2 provides 100G via four 25G interfaces. The MSA for QSFP may be accessed at ftp.seagate.com/sff/INF-8438.PDF.

The 10×10 MSA provides a low cost 100 GbE solution over single mode fiber using 10×10G, i.e. ten 10G signals in parallel. Specifically, the 10×10 MSA is available at www.10×10msa.org/. The 10×10 MSA is compliant with IEEE 802.3ba CAUI, MLD, MAC structure, and the CFP MSA. Of note, the 10×10 MSA utilizes the same form factor as CFP for electrical, mechanical, and firmware interfaces. Those of ordinary skill in the art will recognize that CFP and variants thereof (e.g., CFP2, CFP4, CDFP, CXP), MSA-100GLH, CCRx, QSFP and variants thereof (e.g., QSFP+, QSFP2), 10×10, etc. are presented as exemplary embodiments, and the present disclosure contemplates use of integrated framing, FEC, PMs, OAM&P, alarming, etc. with any particular MSA agreement including newly defined agreements.

Figure 2:
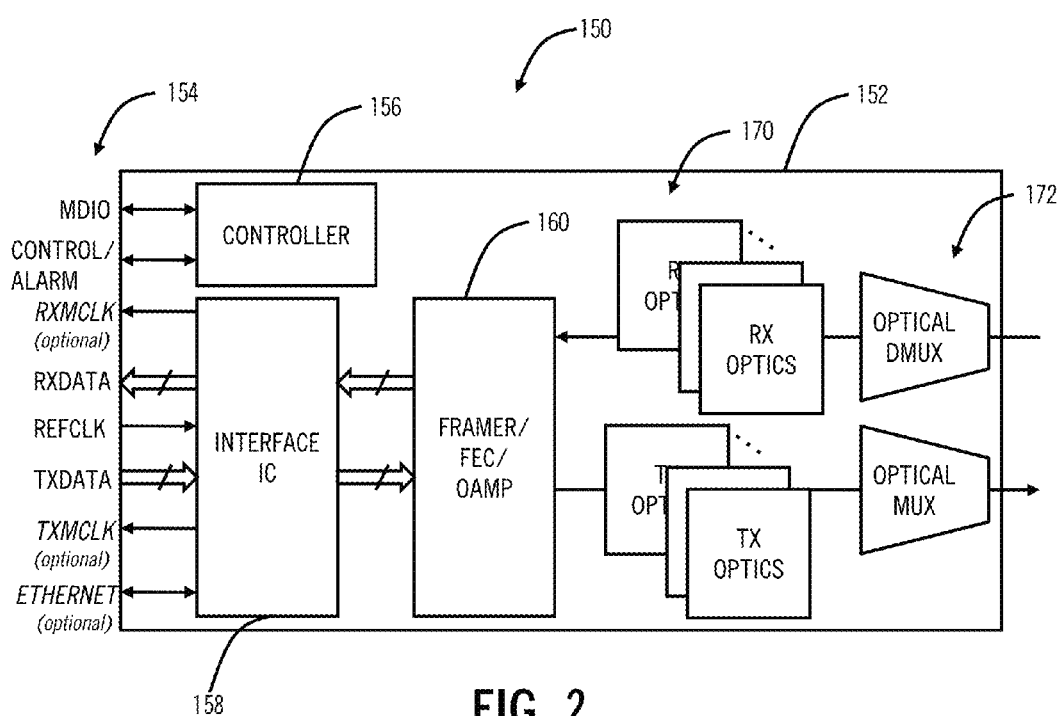
FIG. 2 is a block diagram of a CFP module with integrated framing, FEC, PMs, OAM&P, alarming, etc. while preserving the CFP MSA specifications.

Referring to FIG. 2, in an exemplary embodiment, a block diagram illustrates a CFP module 150 with integrated framing, FEC, PMs, OAM&P, alarming, etc. while preserving the CFP MSA specifications. As described herein, the CFP module 150 is configured to interoperate with any standard CFP host system without requiring hardware and/or software modification of the CFP host system. Optionally, the CFP host system may include software modifications to communicate OAM&P, PM, etc. data on/off the CFP module 150 using standardized CFP communications techniques. The CFP module 150 and the CFP host system are hot-pluggable. In particular, the CFP module 150 includes a physical housing 152. The CFP module 150 includes a plurality of interfaces 154 that interconnect with the CFP host system. For example, the plurality of interfaces 154 may include an MDIO, a control/alarm interface, an optional receive monitor clock (RXMCLK), receive data (RX-DATA), a reference clock (REFCLK), transmit data (TX-DATA), an optional transmit monitor clock (TXMCLK), and an optional communications interface. The optional communications interface may directly provide OAM&P, PM, etc. data from the CFP module 150, and the optional communications interface may include I2C, Serial Peripheral Interface (SPI), RS-232, Ethernet, Ethernet over Universal Serial Bus (USB), Proprietary USB, and the like.

Management Data Input/Output (MDIO), also known as Serial Management Interface (SMI) or Media Independent Interface Management (MIIM), is a serial bus defined for the Ethernet family of IEEE 802.3 standards for the Media Independent Interface, or MII. I2C (also stylized as I²C) (Inter-Integrated Circuit), is a multi-master, multi-slave, single-ended, serial computer bus invented. It is typically used for attaching lower-speed peripheral ICs to processors and microcontrollers in short-distance, intra-board communication.

The CFP module 150 includes a controller 156, an interface integrated circuit 158, a framer/FEC/OAM&P circuit 160, optical interfaces 170, and optical demultiplexer/multiplexer 172. It should be appreciated that the block diagram of FIG. 35 is an oversimplified illustration of the CFP module 150 and a practical embodiment may include other components which are not illustrated. The controller 156, the interface integrated circuit 158, and the framer/FEC/OAM&P circuit 160 generally include electrical circuits, such as, ASICs, FPGAs, microprocessors, digital signal processors, or other types of logic processing devices configured to operate on digital electrical signals. The controller 156 is generally configured to operate the functionality of the CFP module 150 and to interface MDIO, control, and alarming data to the CFP host system. The interface integrated circuit 158 is configured to provide the various interfaces to/from the CFP host system. The framer/FEC/OAM&P circuit 160 is configured to provide framing, FEC, and OAM&P on a client signal within the CFP module 150 while concurrently preserving the MSA specifications such that the CFP module 150 can operate in any CFP compliant host system. In an exemplary embodiment, the controller 156, the interface integrated circuit 158, and the framer/FEC/OAM&P circuit 160 may be integrated in a single circuit. In another exemplary embodiment, the interface integrated circuit 158 and the framer/FEC/OAM&P circuit 160 may be integrated in a single circuit. In yet another exemplary embodiment, the various circuits 156, 158, 160 may be realized in separate circuits with interconnects therebetween.

As described herein, the CFP module 150 includes the framer/FEC/OAM&P circuit 160 integrated within the CFP module 150 for providing integrated framing, FEC, OAM&P, etc. within a standard CFP MSA compliant device. That is, the CFP module 150 may operate in any CFP compliant host device, and has the added functionality of integrated framing, FEC, OAM&P, etc. In an exemplary embodiment, the framer/FEC/OAM&P circuit 160 is configured to frame each 10G in 4×10G or each 25G in 4×25G in an OTN-based wrapper with OAM&P overhead and FEC. In another exemplary embodiment, the framer/FEC/OAM&P circuit 160 is configured to frame the 4×10G as a single 40G or the 4×25G as a single 100G in an OTN-based wrapper with OAM&P overhead and FEC. Generally, the framer/FEC/OAM&P circuit 160 may operate in a similar fashion as described herein with other MSAs such as XFP, XPAK, XENPAK, X2, XFP-E, SFP, SFP+, and 300-pin.

In an exemplary embodiment, the interfaces 154 may include a communications interface that is shown on the front of the CFP module 100 in FIG. 1 as Ethernet port 110 in addition to optical ports 112, 114. In the CFP MSA, the optical ports 112, 114 provide optical transmit and receive ports. The present disclosure may add the Ethernet port 110 as a third port on the front of the CFP module 150 for purposes of OAM&P, PMs, etc. That is, the controller 156 may include an Ethernet switch which provides notification of alarming, PM, OAM&P, etc. data to/from the CFP module 150. The Ethernet port 110 allows a full complement of OTN overhead data to be pulled off the CFP module 150 such as opposed to the reduced OTN overhead described in FIG. 11. Also, the Ethernet port 110 may be connected in a daisy chain fashion to other Ethernet ports 110 on other CFP modules 150 with one of the daisy-chained Ethernet port 110 connected to a network management system. The Ethernet port 110 is presented for illustration purposes, and this may alternatively be any of I2C, SPI, RS-232, Ethernet, Ethernet over USB, Proprietary USB, and the like. In another exemplary embodiment, the CFP module 150 may utilize the standard MDIO interface in the interfaces 154 to provide OAM&P data to/from the CFP module 150. The CFP module utilizes MDIO IEEE 802.3 clause 45 for its management interface. The CFP MDIO implementation is defined in a separate document entitled, "CFP MSA Management Interface Specification". Similarly, as described herein, the CFP module 150 may utilize undefined or optional registers to provide OAM&P data to the host system.

Additionally, the Ethernet port 110 can be used with the various other MSAs described herein such as the various 40G and 100G MSA implementations. Of note, the present disclosure provides advanced functionality internal to the various transceivers while concurrently supporting backward compatibility with any host device compliant to the associated MSA standards. In an exemplary embodiment, the various transceivers can be used without providing OAM&P data related to the advanced functionality to the host device. For example, the use of the transceivers described herein may be to provide extra distance, margin, etc. and the OAM&P data developed within the transceiver for this extra functionality may not be provided to the host system. Here, the host system may not have software functionality to read this OAM&P data. An exemplary objective of the Ethernet port 110 is to provide this OAM&P data in a manner that is transparent to the host system. Specifically, the host system in this exemplary embodiment requires no modification—it simply operates in accordance with the MSA specifications. Concurrently, the transceivers described herein provide additional functionality—OAM&P, framing, FEC, integrated amplification, etc.—and this associated OAM&P data can be obtained directly through the Ethernet port 110 or equivalent. Further, the Ethernet port 110 can ultimately communicate to a management system that manages the OAM&P of the transceiver along with other transceivers and integration into other software platforms and management systems.

Figure 3:
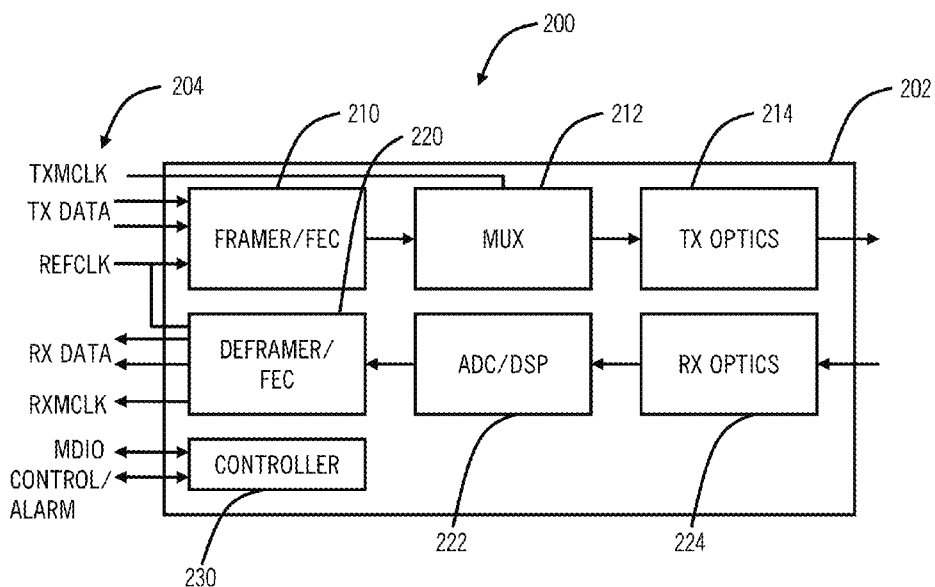
FIG. 3 is a block diagram of an OIF MSA-100GLH module with integrated framing, FEC, PMs, OAM&P, alarming, etc. while preserving the OIF MSA-100GLH MSA specifications.

Referring to FIG. 3, in an exemplary embodiment, a block diagram illustrates an OIF MSA-100GLH module 200 with integrated framing, FEC, PMs, OAM&P, alarming, etc. while preserving the OIF MSA-100GLH MSA specifications. As described herein, the OIF MSA-100GLH module 200 is configured to interoperate with any standard OIF MSA-100GLH host system without requiring hardware and/or software modification of the OIF MSA-100GLH host system. Optionally, the OIF MSA-100GLH host system may include software modifications to communicate OAM&P, PM, etc. data on/off the OIF MSA-100GLH module 200 using standardized OIF MSA-100GLH communications techniques. The OIF MSA-100GLH module 200 includes a physical housing 202. The OIF MSA-100GLH module 200 includes a plurality of interfaces 204 that interconnect with the OIF MSA-100GLH host system. For example, the plurality of interfaces 204 may include an MDIO, a control/alarm interface, a receive monitor clock (RXMCLK), receive data (RXDATA), a reference clock (REFCLK), transmit data (TXDATA), a transmit monitor clock (TXMCLK), and the like.

In the transmit direction, the OIF MSA-100GLH module 200 includes a framer/FEC circuit 210, a multiplexer 212, and transmit optics 214. In the receive direction, the OIF MSA-100GLH module 200 includes a deframer/FEC circuit 220, an ADC/DSP 222, and receive optics 224. Further, the OIF MSA-100GLH module 200 includes a controller 230 configured to monitor and control the OIF MSA-100GLH module 200 as well as provide the MDIO connection to a host system. In an exemplary embodiment, the framer/FEC circuit 210, the multiplexer 212, the deframer/FEC circuit 220, and the ADC/DSP 222 are part of a single circuit, ASIC, etc. In another exemplary embodiment, the framer/FEC circuit 210 and the deframer/FEC circuit 220 are part of a single circuit, ASIC, etc. The framer/FEC circuit 210 is configured to receive a client signal from the host system (TX DATA) and to encapsulate/frame the client signal in an OTN wrapper with FEC, OAM&P overhead, etc. The multiplexer 212 is configured to deserialize an output of the framer/FEC circuit 210 for the transmit optics 214. In an exemplary embodiment, the transmit optics 214 include native 40G or 100G line rates using polarization multiplexing, differential QPSK, and combinations thereof. The receive optics 224 are configured to receive a line signal and provide the line signal to the ADC/DSP 222 for conversion to multiple lanes at lower rates and for signal conditioning. The deframer/FEC circuit 220 is configured to decapsulate/deframe the line signal and provide the client signal to the host system. Similar to the CFP module 150, the OIF MSA-100GLH module 200 utilizes MDIO IEEE 802.3 clause 45 for its management interface. The OIF MSA-100GLH module 200 may utilize undefined or optional registers to provide OAM&P data to the host system via the MDIO. Also, the OIF MSA-100GLH module 200 may include an Ethernet port similar to the Ethernet port 110.

Figure 4:
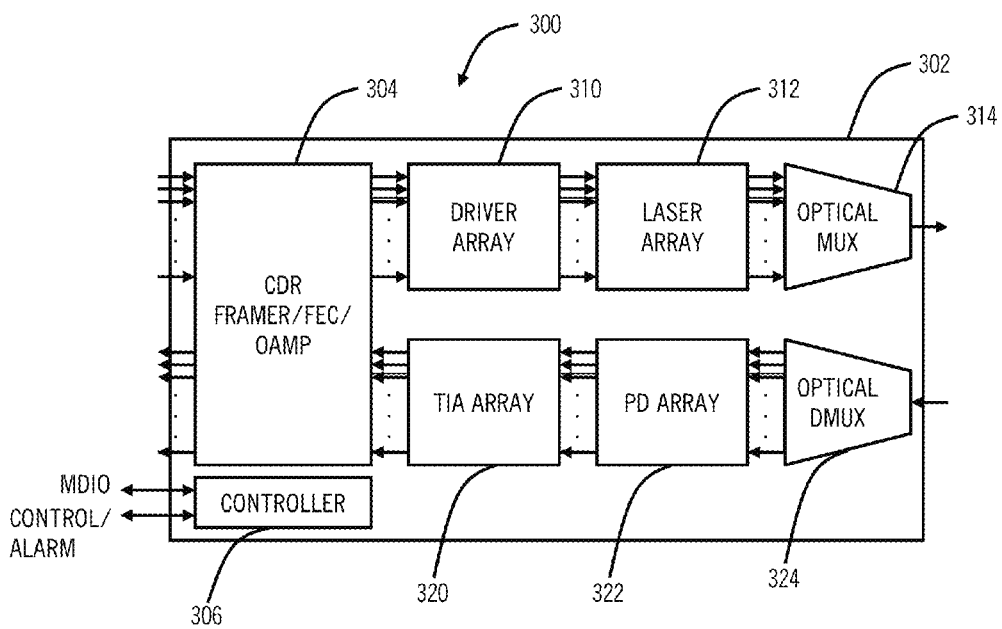
FIG. 4 is a block diagram of a 10×10 module with integrated framing, FEC, PMs, OAM&P, alarming, etc. while preserving the 10×10 MSA specifications.

Referring to FIG. 4, in an exemplary embodiment, a block diagram illustrates a 10×10 module 300 with integrated framing, FEC, PMs, OAM&P, alarming, etc. while preserving the 10×10 and CFP MSA specifications. As described herein, the 10×10 module 300 is configured to interoperate with any standard 10×10 MSA host system without requiring hardware and/or software modification of the 10×10 MSA host system. Optionally, the 10×10 MSA host system may include software modifications to communicate OAM&P, PM, etc. data on/off the 10×10 module 300 using standardized 10×10/CFP MSA communications techniques. The 10×10 module 300 includes a physical housing 302. The 10×10 module 300 also includes a CDR/framer/FEC/OAM&P circuit 304 and a controller 306 each of which interfaces to the 10×10 MSA host system. The circuit 304 is configured to perform clock and data recovery and to generally interface to the host system with ten lanes of 10G. Additionally, the circuit 304 is configured to provide framing, FEC, OAM&P, alarming, etc. within the 10×10 module 300 while still maintaining compatibility with the 10×10 MSA and the CFP MSA. The 10×10 module 300 further includes on the transmit side a driver array 310, a laser array 312, and an optical multiplexer 314 which collectively drive ten wavelengths at 10G each and then combine them via the multiplexer 314, On the receive side, the 10×10 module 300 includes a transimpedance amplifier array 320, a photodiode array 322, and an optical demultiplexer 324 which collectively receive a WDM signal of ten wavelengths at 10G each and demultiplex and convert to electrical for processing by the circuit 304. Note, since the 10×10 MSA is also compliant with the CFP MSA, the 10×10 module 300 may use similar mechanisms as described herein with respect to the CFP module 150 for communicating to the host system or through the Ethernet port 110.

FIGS. 1-4 illustrate exemplary embodiments using CFP, CDFP, OIF MSA-100GLH, and 10×10. Those of ordinary skill in the art will recognize the present disclosure contemplates adding framing, FEC, OAM&P, alarming, etc. into any current or future MSA including emerging 40G, 100G, 400G, 1T, etc. MSAs. That is, the present disclosure strives to integrate additional functionality into optical transceivers while maintaining compatibility with existing host systems, i.e. while preserving MSA specifications for mechanical characteristics, management interfaces, electrical characteristics, optical characteristics, thermal requirements, and the like.

Integrated Optical Amplifiers

Figure 5:
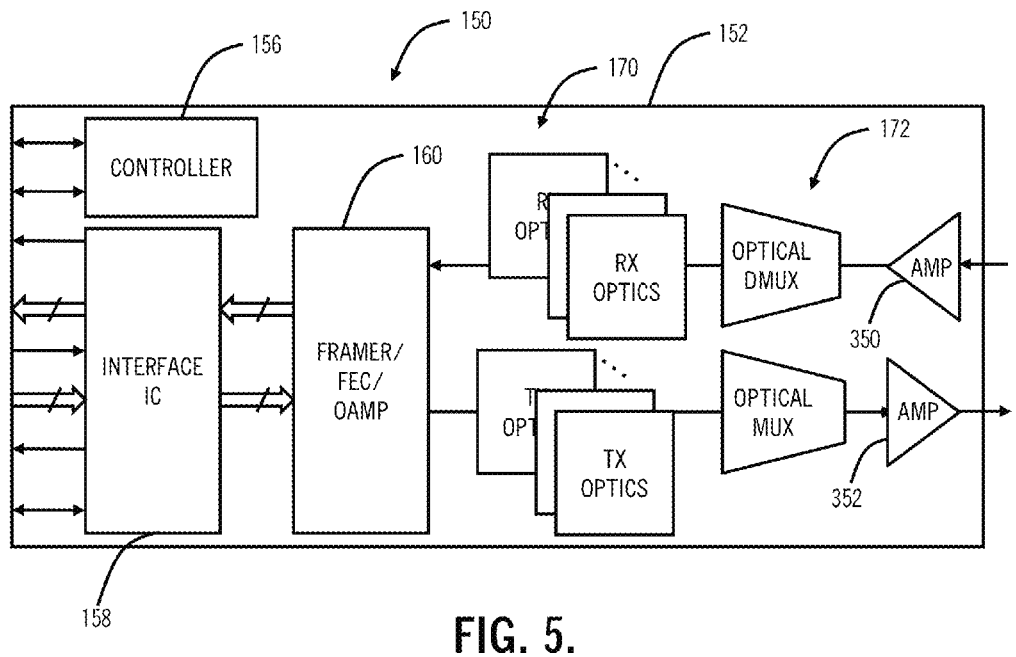
FIG. 5 is a block diagram of the CFP module of FIG. 35 with integrated amplifiers while preserving the CFP MSA specifications.
Figure 6:
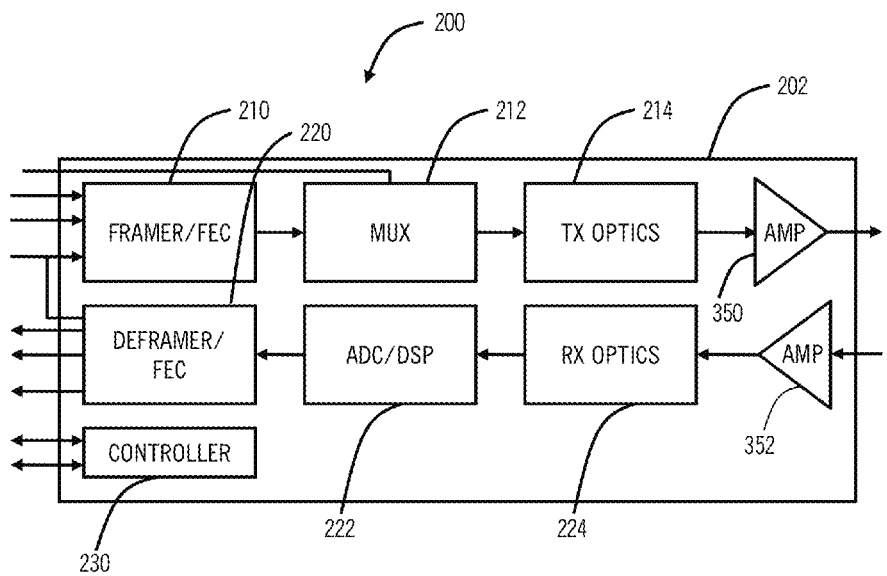
FIG. 6 is a block diagram of an OIF MSA-100GLH module of FIG. 3 with integrated amplifiers while preserving the OIF MSA-100GLH MSA specifications.
Figure 7:
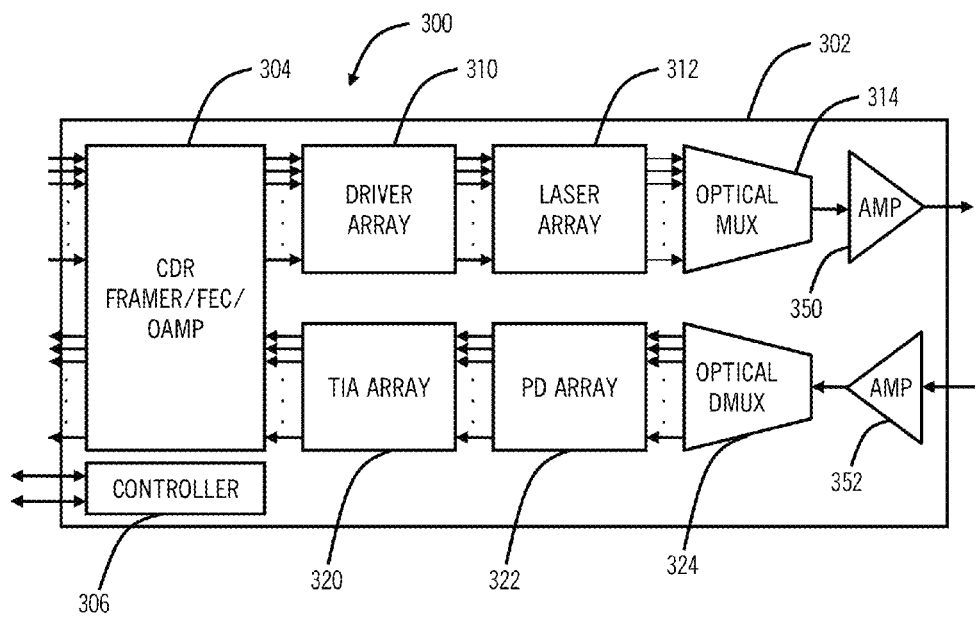
FIG. 7 is a block diagram of a 10×10 module of FIG. 4 with integrated amplifiers while preserving the 10×10 MSA specifications.

Referring to FIGS. 5-7, in exemplary embodiments, the CFP module 150, the OIF MSA-100GLH module 200, and the 10×10 module 300 can include integrated amplifiers 350, 352. The amplifiers 350, 352 can be erbium doped fiber amplifiers (EDFAs), semiconductor optical amplifiers, etc. The amplifier 350 is a preamplifier connected before receiver optics, and the amplifier 352 is a post amplifier connected after transmitter optics. That is, the amplifier 350 is configured to amplify received signals prior to receiver optical components, and the amplifier 352 is configured to amplify transmitted signals from transmitter optical components prior to outputting the signals. The various transceiver modules 150, 200, 300 can also include additional components such as a switch in-line with the amplifiers 350, 352 thereby enabling the amplifiers 350, 2804 to be removed and turned off when not required. For example, when enabled, the switch can be configured to provide optical signals to the amplifiers 350, 352, and when disabled, the switch can be configured to remove the amplifiers 350, 352 from the optical path. Note, the amplifiers 350, 352 can be individually controlled and enabled/disabled separately. In this manner, the amplifiers 350, 352 can provide significantly more performance than is specified in the associated MSAs for the transceiver modules 150, 200, 300.

Again, consistent with the foregoing descriptions, the amplifiers 350, 352 are integrated within the transceiver modules 150, 200, 300 in a manner that preserves backward compatibility with the MSA specifications such that the transceiver modules 150, 200, 300 with the amplifiers 350, 352 can be used in any MSA-compliant host device whether or not the host device is configured to support the amplifiers 350, 352. In an exemplary embodiment, the host device can control and monitor the amplifiers 350, 352 via the various communication mechanisms described herein such as via software support to communicate via MSA-defined registers, etc. In another exemplary embodiment, the Ethernet port 110 can be used to control and monitor the amplifiers 350, 352 such as via a management system or the like. In yet another exemplary embodiment, the amplifiers 350, 352 can be monitored and controlled via custom commands through the host system to the transceiver modules 150, 200, 300 where there is no support directly through the host system.

Figure 8:
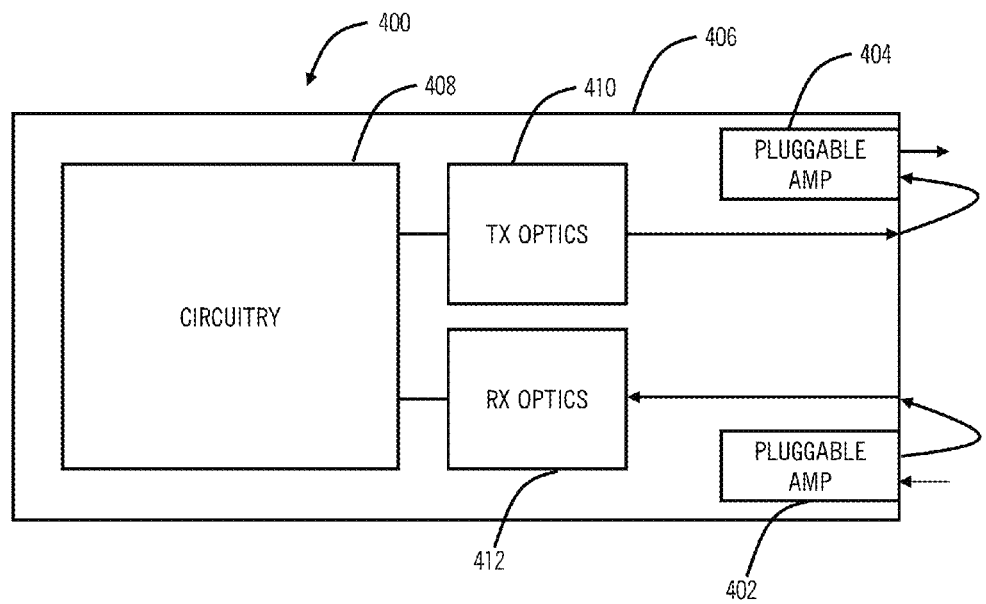
FIG. 8 is a block diagram of a transceiver with pluggable amplifiers contained therein.

Referring to FIG. 8, in an exemplary embodiment, a block diagram illustrates an optical transceiver 400 with pluggable amplifiers 402, 404 contained therein. The transceiver 400 can be any of the foregoing MSA-compliant transceivers described herein, such as specifically the transceiver modules 150, 200, 300. The transceiver 400 includes a physical housing 406 that may be defined by the associated MSA, circuitry 408, transmitter optics 410, and receiver optics 412. The circuitry 408 can include the various components described herein for interfacing the transceiver 400 to an MSA-compliant host device, for serializing/deserializing, FEC, framing, OAM&P, modulation, etc. The transmitter optics 410 and the receiver optics 412 can include various optical components such as modulators, demodulators, lasers, receivers, multiplexers, demultiplexers, etc. Variously, the transmitter optics 410 and the receiver optics 412 are configured, in conjunction with the circuitry 408, to form composite optical signals as defined by the associated MSA specification.

The physical housing 406 includes input ports for the pluggable amplifiers 402, 404 such that the pluggable amplifiers 402, 404 can be selectively inserted as needed for the transceiver 400. The pluggable amplifier 402 is a preamplifier and the pluggable amplifiers 404 is a post amplifier. When inserted, the pluggable amplifiers 402, 404 are physically connected in-line with the transmitter optics 410 and the receiver optics 412 via a small optical fiber cable on the front of the physical housing 406. Note, the pluggable amplifiers 402, 404 can be separately used, e.g. if only a preamplifier is needed, only the pluggable amplifier 402 is inserted and the pluggable amplifier 404 is omitted. As described herein, the transceiver 400 maintains its compatibility with the MSA specifications such that it may be operated in any MSA-compliant host device. Further, the pluggable amplifiers 402, 404 are transparent to the MSA-compliant host device, but may be monitored by the host device using the various communication mechanisms described herein.

Advanced Functionality in MSA Compatible Transceivers

Figure 9:
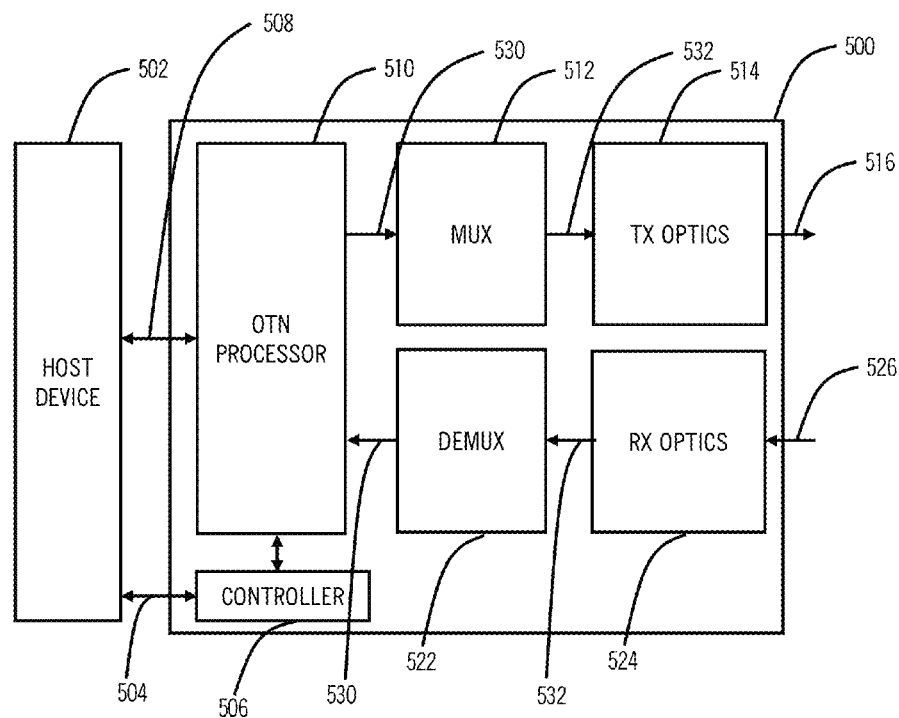
FIG. 9 is a block diagram of a pluggable optical transceiver supporting 40G, 100G, 200G, 400G, etc. with framing and FEC integrated in the pluggable optical transceiver, separate and independent from a host device.

Referring to FIG. 9, in an exemplary embodiment, a block diagram illustrates a pluggable optical transceiver 500 supporting 40G, 100G, 200G, 400G, etc. with framing and FEC integrated into the pluggable optical transceiver 500, separate and independent from a host device 502. The pluggable optical transceiver 500 can include foregoing MSA-compliant transceivers described herein. The pluggable optical transceiver 500 also contemplates future MSAs supporting 40G, 100G, 200G, 400G, etc. An exemplary objective of the pluggable optical transceiver 500 is to perform onboard framing, FEC, and/or OAM&P independent and separate from the host device 502. In an exemplary embodiment, the framing, FEC, and/or OAM&P are performed without involvement or the knowledge of the host device 502. This allows advanced functionality support in the pluggable optical transceiver 500 in any type of the host device 502, which supports the MSA that the pluggable optical transceiver 500 is backward compatible. In other exemplary embodiments, the pluggable optical transceiver 500 can provide OA&MP data related to the framing, FEC, and/or OAM&P to the host device 502. For example, the OA&MP data can be provided via a communication link 504 between a controller 506 on the pluggable optical transceiver 500 and the host device 502. The communication link 502 can use any of the techniques described herein and can include, without limitation, MDIO, I2C, etc.

A communication link 508 is configured to provide data between the pluggable optical transceiver 500 and the host device 502. The communication link 508 includes one or more electrical signaling lanes to provide an aggregate of 40G, 100G, 200G, 400G, etc. The communication link 508 may include a nominal signaling lane rate is 10 Gbit/s per lane with various electrical interface specifications such as CAUI, XLAUI, OTL4.10, OTL3.4, and STL256.4. Other variants may use a signaling lane rate of 25 Gbit/s per lane. For example, the CFP MSA has an electrical interface of 4×10G (XLAUI) or 10×10G (CAUI), the CFP2 MSA has an electrical interface of 4×25G (CAUI2 or CPPI2), and the CFP4 MSA has an electrical interface of 100G. For 200G, 400G, etc., other variants are also contemplated such as 20×10G, 40×10G, 8×25G, 16×25G, 8×50G, 10×40G, 4×100G, etc. That is, the communication link 508 can be expressed as N×M where N is an integer signifying a number of red in the communication link 508 and M is a bit rate value signifying a bit rate for each of the N signaling lanes.

The pluggable optical transceiver 500 includes an OTN processor 510 coupled to the communication link 508. The OTN processor 510 is configured to perform advanced integrated functions including framing, FEC, and/or OAM&P, within the pluggable optical transceiver 500. Again, the advanced integrated functions are performed independently and separately from the host device 502. In some embodiments, associated OAM&P data is provided to the host device 502 from the OTN processor 510 through the controller 506 and the communication link 504. The OTN processor 510 communicates bidirectionally with the host device 502 through the communication link 508. For TX/RX, the OTN processor 510 outputs data to a multiplexer section 512 and TX optics 514 for an optical output 516, and the OTN process 510 receives data from a demultiplexer section 522 which receives data from RX optics 524 which receives an optical input 526. In this manner, the pluggable optical transceiver 500 provides 40G, 100G, 200G, 400G, etc. between the host device 502 and the optical output 516 and the optical input 526. The communication link 508 can be referred to as interface circuitry configured to interface with the host device 502 for providing a high-speed signal between the host device 502 and the pluggable optical transceiver 500. The OTN processor 510 can be referred to as framing and forward error correction circuitry configured to provide framing and forward error correction related to the high-speed signal.

The multiplexer section 512 is configured to receive one or more signaling lanes from the OTN processor 510 through a communication link 530. The multiplexer section 512 is configured to process output data from the OTN processor 510 for presentation to the TX optics 514. For example, in an exemplary embodiment, the communication link 530 has X signaling lanes and an output of the multiplexer section 512 on a communication link 532 has Y signaling lanes, X Y. In another exemplary embodiment, X=Y. For example, in a 100G device, X may equal 10 lanes and Y may equal 4 lanes. Other embodiments are also contemplated.

The TX optics 514 include lasers and modulators to take data from the communication link 532 and optically transmit it on the optical output 516. The TX optics 514 can include WDM/DWDM/CWDM components to transmit each of the Y signaling lanes on a separate wavelength. Each of the Y signaling lanes is used to modulate a wavelength. The TX optics 514 can include any transmission technique such as direct detection, coherent, polarization multiplexing, etc. In an exemplary embodiment, where Y=4 lanes, the TX optics 514 may include 4×28G DWDM transmission for a 100G client. Here, 4 wavelengths are used to transport a 112G signal (the difference between 100G and 112G being the framing overhead and FEC). That is, the TX optics 514 can include components supporting Y wavelength transmission, for each of the Y signaling lanes from the communication link 532. The optical output 516 is a WDM/DWDM/CWDM signal with the Y wavelengths.

The optics 524 and the demultiplexer section 522 perform the opposite functionality on the optical input 526 as the TX optics 514 and the multiplexer section 512. That is, the pluggable optical transceiver 500 is configured to connect to another pluggable optical transceiver 500 via an optical link, with the optical output 516 from a first pluggable optical transceiver 500 being the optical input 526 of a second pluggable optical transceiver 500 and the optical input 526 of the first pluggable optical transceiver 500 being the optical output 516 from the first pluggable optical transceiver 500. The RX optics include receivers and demodulators to take optical data from the optical input 526 and convert it to electrical signals output on a communication link 4234 which has Y signaling lanes to correspond to the communication link 532. The demultiplexer section 522 receives the Y signaling lanes from the communication link 532 and provides X signaling lanes on a communication link 530 to the OTN processor 510.

Interface Module

Figure 10:
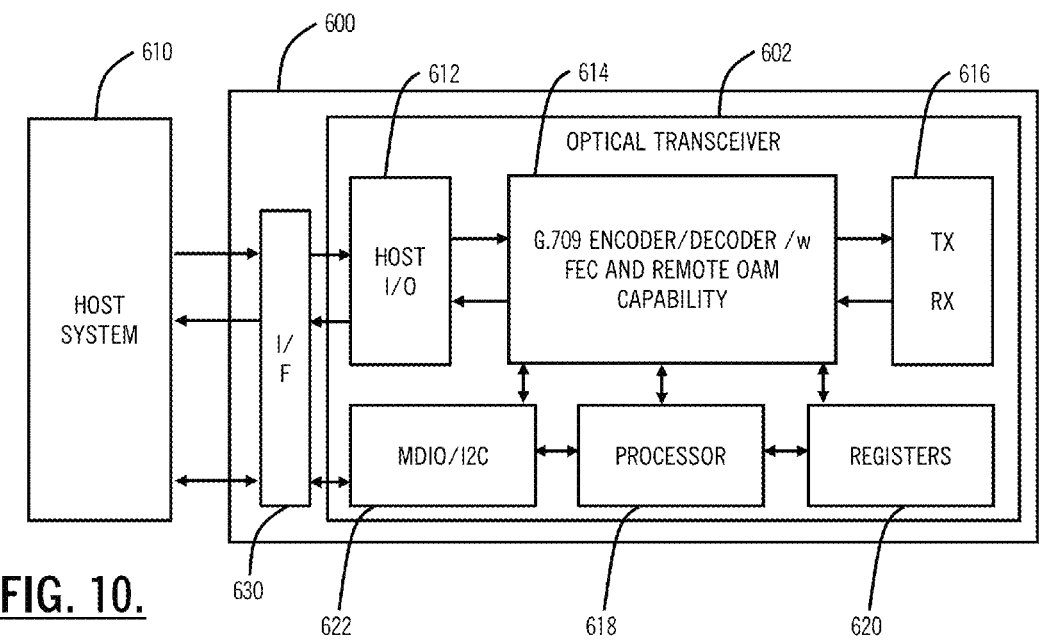
FIG. 10 is a block diagram of a pluggable optical transceiver interface module adapted to receive a pluggable optical transceiver and to interface with the host system.
Figure 11:
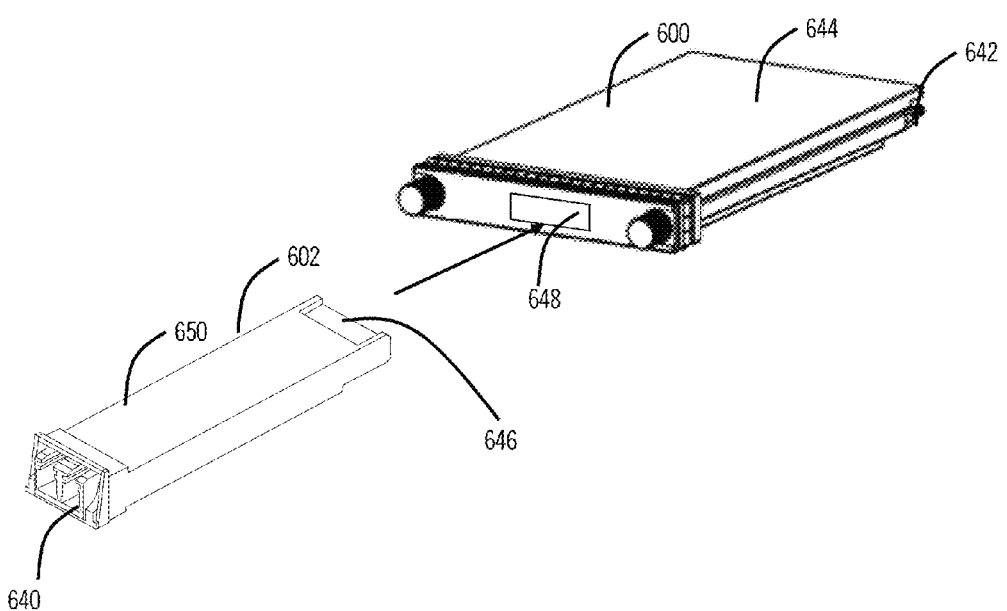
FIG. 11 is a perspective diagram of the pluggable optical transceiver selectively engaging the pluggable optical transceiver interface module of FIG. 10.

Referring to FIG. 10, in an exemplary embodiment, a block diagram illustrates a pluggable optical transceiver interface module 600 adapted to receive a pluggable optical transceiver 602 and to interface with the host system 610. Referring to FIG. 11, in an exemplary embodiment, a perspective diagram illustrates the pluggable optical transceiver 602 selectively engaging the pluggable optical transceiver interface module 600. Specifically, FIG. 10 illustrates the functionality of the interface module 600 and the optical transceiver 602 whereas FIG. 11 illustrates the housing and form factor.

The optical transceiver 602 can include any MSA-compatible optical transceiver, such as CFP and variants thereof (e.g., CFP2, CFP4, CXP), CDFP and variants thereof (e.g., CDFP2, CDFP4, etc.), MSA-100GLH, CCRx, QSFP and variants thereof (e.g., future QSFP+, QSFP2), 10×10, XFP, XPAK, XENPAK, X2, XFP-E, SFP, SFP+, 300-pin, and the like. As described herein, the present disclosure includes additional circuitry on the optical transceiver 602 to provide integrated framing functionality, optical layer OAM&P, FEC, data encapsulation, performance monitoring, and alarming in the optical transceiver 602. This additional circuitry is configured to preserve the specifications of the MSA defining the optical transceiver 602. Accordingly, the optical transceiver 602 is configured to operate in any host system 610 configured to operate according to the MSA specifications.

The optical transceiver 602 includes a host input/output (I/O) module 612, a G.709 encoder/decoder 614, a Tx/Rx module 616, a processor 618, registers 620, and an MDIO/I2C interface 622. Note, the various modules 612-622 can be integrated within various ASICs on the optical transceiver 602. The host I/O module 612 is configured to interface with the host system 610 according to the MSA specifications. For example, the module 612 can include a XAUI, serial interface, or the like. As described herein, the G.709 encoder/decoder 614 is configured to frame/un-frame, encode/decode FEC, and process overhead integrated within the optical transceiver 602 while preserving the MSA specifications. The Tx/Rx module 616 provides the physical optical input/output. The Tx/Rx module 616 can include fixed wavelengths, tunable wavelengths across a certain range, or the like.

The optical transceiver 602 includes a processor 618 which is communicatively coupled to the G.709 encoder/decoder 614, multiple registers 620, and an MDIO/I2C interface 622. The processor 618 is a hardware device for executing software instructions. The processor 618 can be any custom made or commercially available processor, a central processing unit (CPU), an auxiliary processor among several processors, a semiconductor-based microprocessor (in the form of a microchip or chip set), or generally any device for executing software instructions.

In an exemplary embodiment, the processor 618 is configured to process and provide performance monitoring (PM) data and alarming based on the overhead and FEC from the G.709 encoder/decoder 614. Additionally, the processor 618 is configured to export PM and alarm data off the optical transceiver 618 through the MDIO/I2C interface 622. For example, the processor 618 can be configured to bridge data on the MDIO/I2C interface 622 through unused, undefined, reserved, or optional registers in the MSA specification to provide an MSA-compliant mechanism to report the data to the host system 610. Additionally, the processor 618 can export the PM and alarm data to a far-end, through overhead in the G.709 encoder/decoder 614.

As described herein, the G.709 encoder/decoder 614 is configured to transmit/receive a signal to/from the host I/O 612. The signal is decoded/encoded with FEC and de-framed/framed with overhead. The G.709 encoder/decoder 614 is configured to strip out incoming overhead, and process the overhead in conjunction with the processor 618. Advantageously, the integration of framing, FEC, and OAM&P into the MSA optical transceiver 602 enables performance monitoring and alarming at a carrier-grade level without extra equipment. This functionality is integrated into the optical transceiver 602 while preserving the existing MSA specifications. Accordingly, the optical transceiver 602 can operate in any MSA-compliant host system 610. The host system 610 can be configured to retrieve PMs and alarms from the optical transceiver 602 through software modifications only, i.e. to read the registers used for this data.

The optical transceiver 602 can operate in a transparent mode and an enhanced mode. In the transparent mode, the module can be used with existing host device 610 driver software without any alteration. In this mode, the OTN framing and Forward Error Correction features are always turned on but all associated Overhead Management information is terminated within the optical transceiver 602 and is transparent to the host device 610 driver software. The optical transceiver 602 can be built with the necessary intelligence to recognize the LOGE PHY mode (LAN PHY or WAN PHY) the host device 610 wants to configure, by monitoring register 2.7.0 PCS Type Selection, and sets all appropriate OTN frame registers, VCXO frequencies, etc. . . . to accommodate the proper OTN bit rate for the mode selected. In the Transparent Mode, the optical transceiver 602 offers 4× higher DWDM performance and enhanced reach thanks to the Forward Error Correction coding gain feature.

In the Enhanced mode, in addition to selecting a LAN or WAN PHY, the host can also turn-on and off the OTN and FEC features. In this mode, the host has full accessibility to all the OTN G.709 OAM features so that an ITU OTN compliant 10 Gbps optical interface can be supported and exposed to a higher layer software entity. Management data from and to the host is supported via the standard MDIO/I2C interface 622 (so no hardware change is necessary). Network operators can access various components of the overhead on the optical transceiver 602 through the host system 610 and the MDIO/I2C interface 622. The host system 610 can be configured to retrieve various PMs and alarm information from the registers 620 through the MDIO/I2C interface 622. This information can be imported through the host system 610 to an EMS system for access by network operators. The present disclosure contemplates access to all alarms in ITU-T G.709, all six Tandem Connection Monitoring (TCM) bytes in G.709, far end monitoring as specified in G.709, loopbacks, historical and real-time PM values for FEC, section, and path, and the like.

In FIG. 11, the pluggable optical transceiver 602 can be the pluggable optical transceiver 602 or any of the other pluggable optical transceivers described herein with the associated functionality. Again, the functionality of the pluggable optical transceiver 602 can include, without limitation, framing, FEC, OAM&P, tunable wavelengths, etc. The associated functionality can be independent of the host system 610, in conjunction with the host system 610, or a hybrid where the host system 610 has some limited visibility or control of the advanced functionality. In an exemplary embodiment, the pluggable optical transceiver 602 can be an MSA compliant transceiver, preferably compliant to a relatively small form factor MSA, such as XFP, CFP4, QSFP28, etc. In this case, the pluggable optical transceiver 602 could be housed in the host system 610 if the host system 610 supported the specific MSA that the pluggable optical transceiver 602 was compliant to. If not, the interface module 600 is used to convert the MSA to one that is supported by the host system 610.

In another exemplary embodiment, the pluggable optical transceiver 602 can be a pluggable optical transceiver, but not necessarily compliant to any MSA specification. Here, the pluggable optical transceiver 602 is a functional subsystem that is not supported in the host system 610 except through the interface module 600 which is for a specific MSA supported by the host system 610.

In either of the above exemplary embodiments, the pluggable optical transceiver 602 supports the base optical transceiver functionality as well as supporting optical connections to the Tx/Rx module 616. The Tx/Rx module 616 is part of the pluggable optical transceiver 602 and has associated optical connectors 640. Specifically, the optical connections externally are to the optical connectors 640 on the pluggable optical transceiver 602 whereas the backplane pin connections from the pluggable optical transceiver 602 are to interface circuitry 630 on the interface module 600. The interface module 600 has external connectors 642 which physically interface to the host system 610 and internal connectors (not shown in FIG. 44) which connect to connectors 646 on the pluggable optical transceiver 602.

Thus, the interface module 600 is a carrier card. The interface module 600 is compliant to an MSA, different from the pluggable optical transceiver 602. The interface module 600 includes a housing 644, which is larger than a housing 650 for the pluggable optical transceiver 602. The interface module 600 includes a slot 648 dimensioned based on the housing 650 and adapted to receive the pluggable optical transceiver 602.

The interface circuitry 630 is adapted to perform signal and timing conversion between the pluggable optical transceiver 602 and the host system 610. The interface circuitry 630 is adapted to bridge a first MSA associated with the pluggable optical transceiver 602 to a second MSA associated with the interface module 600 and supported by the host system 610.

In an exemplary embodiment, the pluggable optical transceiver interface module 600 is adapted to operate in the host system 610. The interface module 600 includes a housing 644 compliant to a first Multi-Source Agreement (MSA), wherein the housing is adapted to plug into the host system 610; a slot 648 in the housing 644 adapted to receive a pluggable optical transceiver 602, wherein the pluggable optical transceiver 602 includes an optical transmitter and an optical receiver 616 with associated connectors 640; and interface circuitry 630 communicatively coupled to the pluggable optical transceiver 602 and to the host system 610, wherein the interface circuitry 630 is adapted to bridge data and power connectivity to the pluggable optical transceiver 602 according to the first MSA, and wherein the pluggable optical transceiver 602 is not compliant to the first MSA.

The pluggable optical transceiver 602 can include a communication link 612 configured to interface with the host system 610 through the interface circuitry 630 for providing a high-speed signal therebetween; framing and forward error correction circuitry 614 configured to provide framing and forward error correction related to the high-speed signal; transmitter optical components communicatively coupled to the framing and forward error correction circuitry and configured to transmit a composite optical output signal from the optical transmitter; and receiver optical components communicatively coupled to the circuitry and configured to receive a composite optical input signal from the optical receiver; wherein the framing and forward error correction is performed within the pluggable optical transceiver 602 separately and independently from the host system 610 and the pluggable optical transceiver interface module 600.

The pluggable optical transceiver 602 can be compliant to a second MSA, different from the first MSA. The pluggable optical transceiver 602 can be a subsystem not compliant to any MSA. The pluggable optical transceiver 602 can be compliant to QSFP28, and the first MSA is any of CFP, CFP2, and CFP4. The pluggable optical transceiver 602 can be compliant to XFP, and the first MSA is XENPAK. The housing 644 is larger than a housing 650 associated with the pluggable optical transceiver 602.

The optical transmitter and the optical receiver may not be compliant to the first MSA and operate independently of the host system 610 and the pluggable optical transceiver interface module 600, wherein the interface circuitry provides an output signal compliant to the first MSA. Specifically, this can be a bookend configuration where a communications link includes adjacent interface modules 600 with associated pluggable optical transceivers 602. Note, the MSAs typically define optical characteristics, such as wavelengths, modulation format, bit rate, etc. In the bookend configuration, the optical characteristics do not have to be followed since the interface module 600 will provide MSA compliant electrical signals to the host systems 610, i.e., it does not matter if the optical characteristics of the pluggable optical transceivers 602 comply with the first MSA associated with the interface modules 600.

In another exemplary embodiment, a method with a pluggable optical transceiver interface module adapted to operate in a host device includes providing a housing compliant to a first Multi-Source Agreement (MSA), wherein the housing is adapted to plug into the host device; providing a slot in the housing adapted to receive a pluggable optical transceiver, wherein the pluggable optical transceiver includes an optical transmitter and an optical receiver with associated connectors; and providing interface circuitry communicatively coupled to the pluggable optical transceiver and to the host device, wherein the interface circuitry is adapted to bridge data and power connectivity to the pluggable optical transceiver according to the first MSA, and wherein the pluggable optical transceiver is not compliant to the first MSA.

In a further exemplary embodiment, a pluggable optical transceiver system includes a first module including an optical transmitter and an optical receiver with associated connectors; and a pluggable optical transceiver interface module adapted to receive the first module and to operate in a host device, wherein the pluggable optical transceiver interface module includes: a housing compliant to a first Multi Source Agreement (MSA), wherein the housing is adapted to plug into the host device; a slot in the housing adapted to receive the first module; and interface circuitry communicatively coupled to the first module and to the host device, wherein the interface circuitry is adapted to bridge data and power connectivity to the first module according to the first MSA, and wherein the first module is not compliant to the first MSA.

Again, in various exemplary embodiments, the present disclosure relates to a pluggable optical transceiver interface module and method which adapts one Multi-Source Agreement (MSA) compliant optical transceiver to support another type of MSA, e.g., an XFP in a XENPAK, a QSFP28 in a CFP2 or CFP4, etc. That is, the interface module and method provides a first module supporting a set of functionality. The first module can be compliant to an MSA, such as an XFP, QSFP28, etc. The first module can be inserted and housed in the interface module to form a second module that is compliant to a different MSA. For example, an XFP module can be housed in an interface module to form an XENPAK module or a QSFP28 module can be housed in the interface module to form a CFP2, CFP, or CFP4 module. Thus, the interface module serves as an MSA converter. In another exemplary embodiment, the first module may not be a pluggable transceiver, but rather a subsystem with optical interfaces that is inserted into the interface module to form a desired MSA compliant transceiver.

Thus, the first module includes the optical interfaces, electrical circuitry, and the like to provide optical transceiver functionality, including, e.g., tunable wavelengths, framing, Forward Error Correction, and OAM&P processing, i.e., advanced functionality. The interface module is configured to adapt the first module to support a plurality of different MSA specifications. The interface module is configured to bridge the first module to support a specific MSA, namely providing connector conversion, timing adjustments, host interface adjustments, etc.

Advantageously, the interface module allows for streamlined design and manufacturing of advanced pluggable transceivers. Vendors can simply manufacture one set of first modules, i.e., no requirements for a different module for each MSA specification. In turn, operators can use the first modules with associated interface modules as required for specific applications. From a product design and manufacturing perspective, the interface module is relatively low cost and complexity with the advanced functionality focused on the first module.

Figure 12:
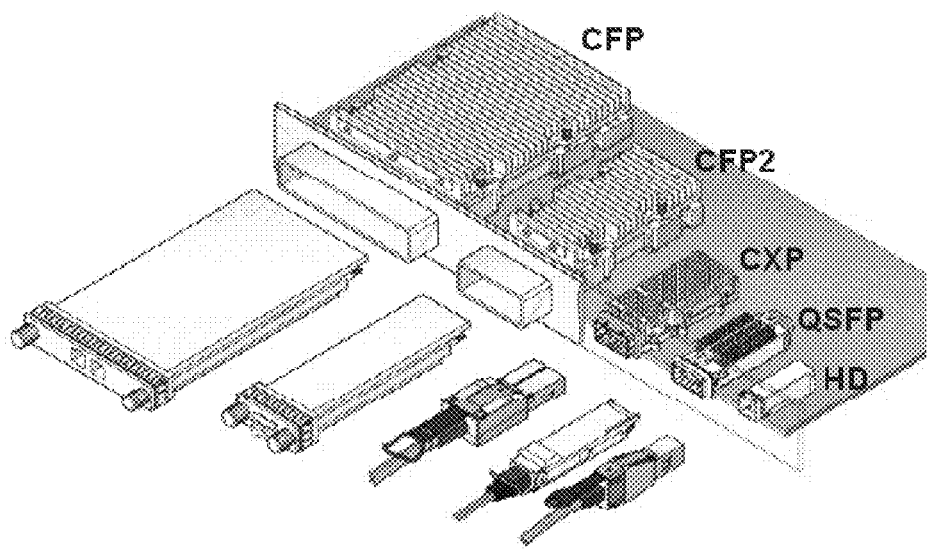
FIG. 12 is a perspective diagram of different MSAs, namely CFP, CFP2, CXP, QSFP, and HD, and associated form factors of the compliant pluggable optical transceivers and the housings in the host system.

Referring to FIG. 12, in an exemplary embodiment, a perspective diagram illustrates different MSAs, namely CFP, CFP2, CXP, QSFP, and HD, and associated form factors of the compliant pluggable optical transceivers 602 and the housings in the host system 610. Note, the present disclosure contemplates the interface modules 600 for any MSA where the pluggable optical transceivers 602 is physically smaller than the MSA for the interface module 600.

Figure 13:
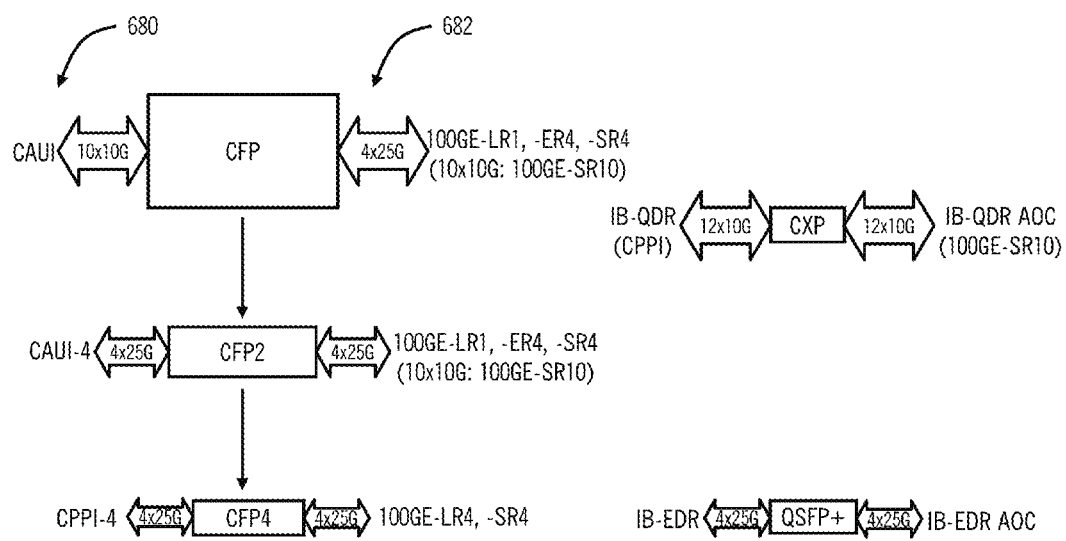
FIG. 13 is a block diagram of electrical interfaces between MSA-compliant pluggable optical transceivers and the host system and optical connectivity out of the pluggable optical transceivers.

Referring to FIG. 13, in an exemplary embodiment, a block diagram illustrates electrical interfaces 680 between MSA-compliant pluggable optical transceivers 602 and the host system 610 and optical connectivity 682 out of the pluggable optical transceivers 602. The interface circuitry 630 can interface between CAUI (10×10), CAUI-4 (4×25), CPPI-4 (4×25), ID-QDR (CPPI) (12×10), IB-EDR (4×25), and the like. Again, it is not important to align the optical connectivity 682 since the host system 610 does not necessarily need to be compliant to the optical connectivity 682.

Figure 14:
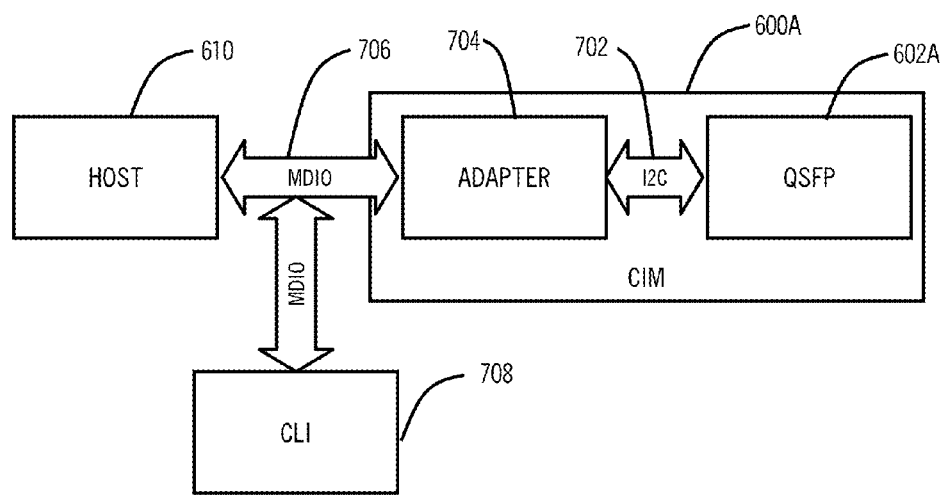
FIG. 14 is a block diagram of the pluggable optical transceiver interface module, such as a CFP variant, adapted to receive a pluggable optical transceiver, such as a QSFP variant, and to interface with the host system.

Referring to FIG. 14, in an exemplary embodiment, a block diagram illustrates the pluggable optical transceiver interface module 600A, such as a CFP variant, adapted to receive a pluggable optical transceiver 602A, such as a QSFP variant, and to interface with the host system 610. Specifically, the interface module 600A can be compliant to a CFP variant, i.e., CFP, CFP2, CFP4, and the optical transceiver 602A can be compliant to a QSFP variant, i.e., QSFP, QSFP+, QSFP28. In an exemplary embodiment, the interface module 600A is compliant to CFP2 and the optical transceiver 602A is compliant to QSFP28. Again, the interface module 600A is configured to receive the optical transceiver 602A and provide management interfaces via an I2C interface 702 between the optical transceiver 602A and an adapter 704 in the interface module 600A. The adapter 704 is configured to provide management interfaces to the host system 610 via an MDIO interface 706. Also, the MDIO interface 706 can be used for a Command Line Interface (CLI) 708 to the interface module 600A and the optical transceiver 602A.

The host system 610 interfaces for management to the interface module 600A based on the MSA protocol associated with the interface module 600A, e.g., the MDIO interface 706. The adapter 704 is configured to convert the management interfaces to the MSA protocol associated with the optical transceiver 602A, e.g., the I2C interface 702.

Figure 15:
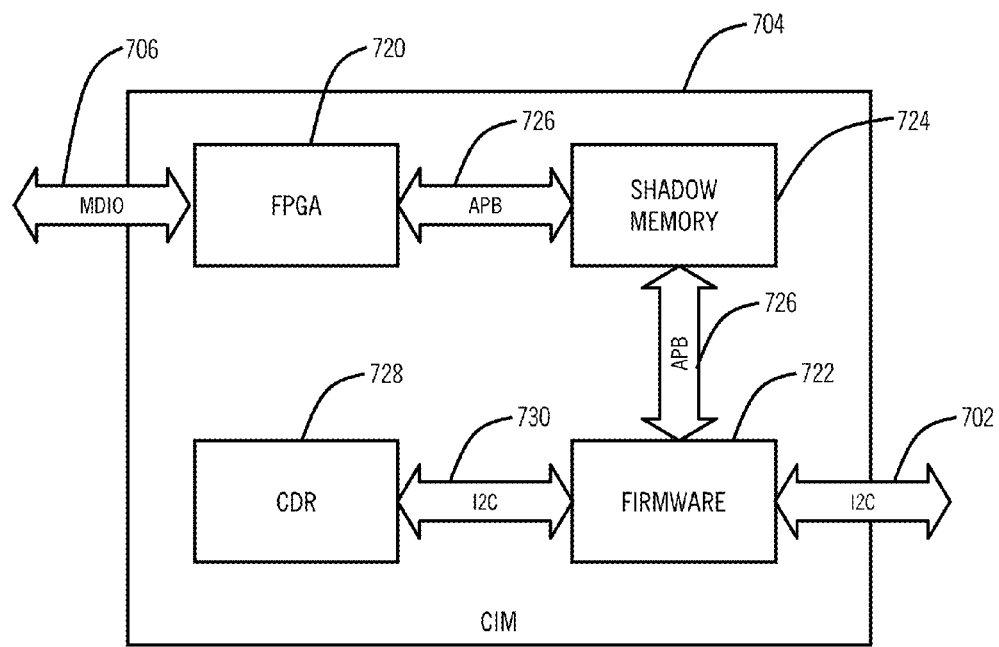
FIG. 15 is a block diagram of the adapter in the pluggable optical transceiver interface module of FIG. 14.

Referring to FIG. 15, in an exemplary embodiment, a block diagram illustrates the adapter 704 in the pluggable optical transceiver interface module 600A. Again, the adapter 704 is configured to interface two different management protocols, such as the MDIO interface 706 between the I2C interface 702. The MDIO interface 706 connects to a Field Programmable Gate Array (FPGA) 720 and the I2C interface 702 connects to firmware 722. The interface module 600A includes shadow memory 724 which connects to both the FPGA 720 and the firmware 722 via an Advanced Peripheral Bus (APB) 726. The firmware 722 also connect to clock and data recovery (CDR) circuitry 728 via an I2C interface 730. Collectively, the components in the adapter 704 provide a conversion between one management interface for one MSA, e.g., the MDIO interface 706, to another management interface for another MSA, e.g., the I2C interface 702.

Figure 16:
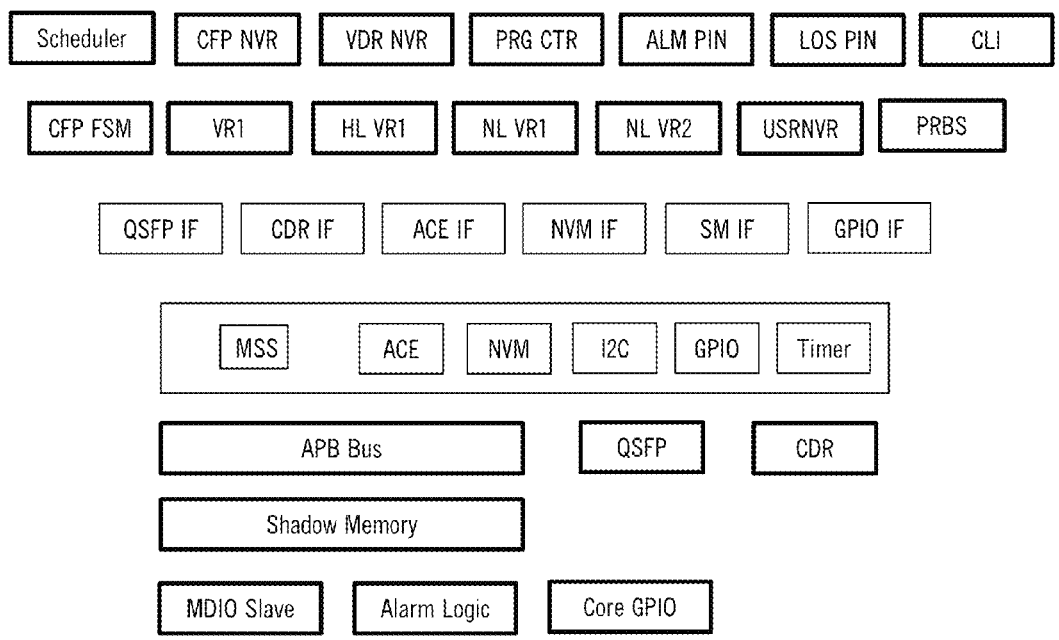
FIG. 16 is a logical layered diagram of the firmware and the FPGA architecture of the adapter in FIG. 15.

Referring to FIG. 16, in an exemplary embodiment, a logical layered diagram illustrates the firmware 722 and the FPGA 720 architecture. The first layer includes a scheduler, CFP Non-volatile registers (NVR), VDR NVR, a Program Counter (PRG CTR), Alarm PIN (ALM PIN), Loss of Signal PIN (LOS PIN), Command Line Interface (CLI), CFP Finite State Machine (FSM), Volatile Register 1 (VR1), Host Lane (HL) VR1, Network Lane (NL) VR1, NL VR2, User NVR (USRNVR), and PRBS. A second layer includes a QSFP Interface (IF), a CDR IF, ACE IF, Non-Volatile Memory (NVM) IF, SM IF, and General-purpose input/output (GPIO) IF. Another layer includes a Microcontroller Subsystem (MSS) for the ACE, NVM, I2C, GPIO, and a timer. Another layer includes the APB 726 bus, the shadow memory 724, an MDIO slave, alarm logic, and Core GPO.

Figure 17:
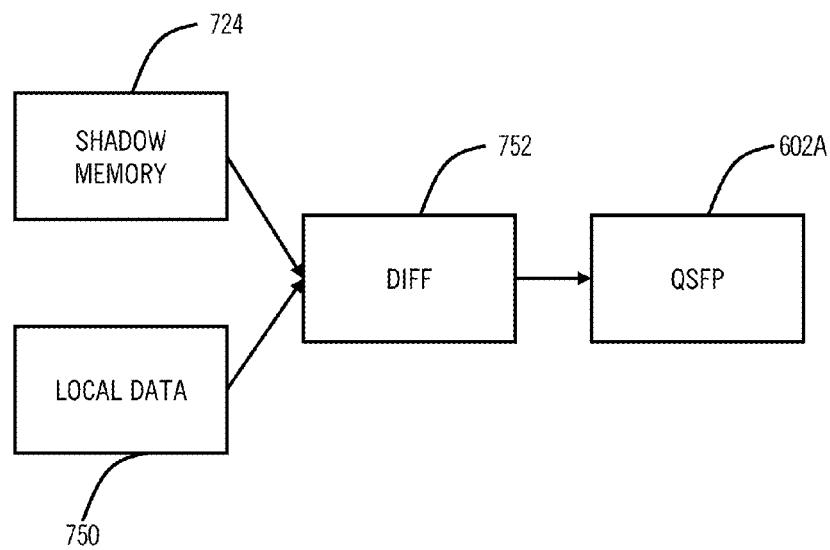
FIG. 17 is a flowchart of data flow in the firmware for configuration of the optical transceiver via the pluggable optical transceiver interface module.
Figure 18:
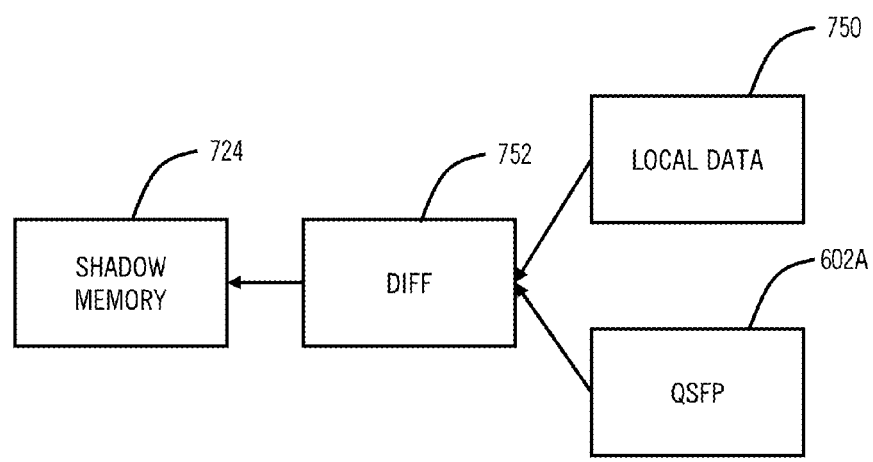
FIG. 18 is a flowchart of data flow in the firmware for monitoring of the optical transceiver via the pluggable optical transceiver interface module.

Referring to FIG. 17, in an exemplary embodiment, a flowchart illustrates data flow in the firmware for configuration of the optical transceiver 602A via the pluggable optical transceiver interface module 600A. For configuration, local data 750 from the host device 610 to the interface module 600A is combined/difference 752 with data in the shadow memory 724 and provided to the optical transceiver 602A, e.g., the QSFP. Referring to FIG. 18, in an exemplary embodiment, a flowchart illustrates data flow in the firmware for monitoring of the optical transceiver 602A via the pluggable optical transceiver interface module 600A. For monitoring, local data 750 and data from the optical transceiver 602A is combined/difference 752 and provided to the shadow memory 724.

Figure 19:
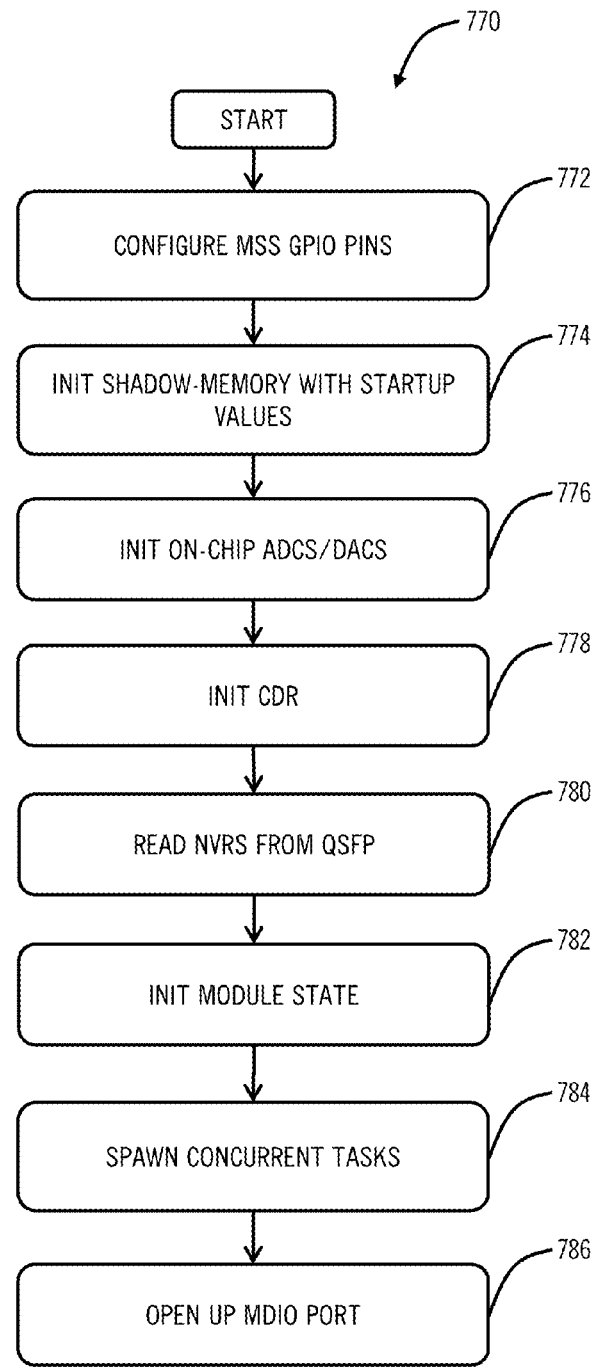
FIG. 19 is a flowchart of an initialization process for the adapter in the pluggable optical transceiver interface module.

Referring to FIG. 19, in an exemplary embodiment, a flowchart illustrates an initialization process 770 for the adapter 704 in the pluggable optical transceiver interface module 600A. The initialization process 770 include configuration of the MSS GPIO pins (step 772), initialization of the shadow memory 724 with startup values (step 774), initialization of on-chip analog-digital converters (ADCs) and digital-analog converters (DACs) (step 776), initialization of the CDR 728 (step 778), reading the NVRs from the QSFP (step 780), initialization of the module state (step 782), spawning of concurrent tasks (step 784), and opening up the MDIO port (step 786).

Figure 20:
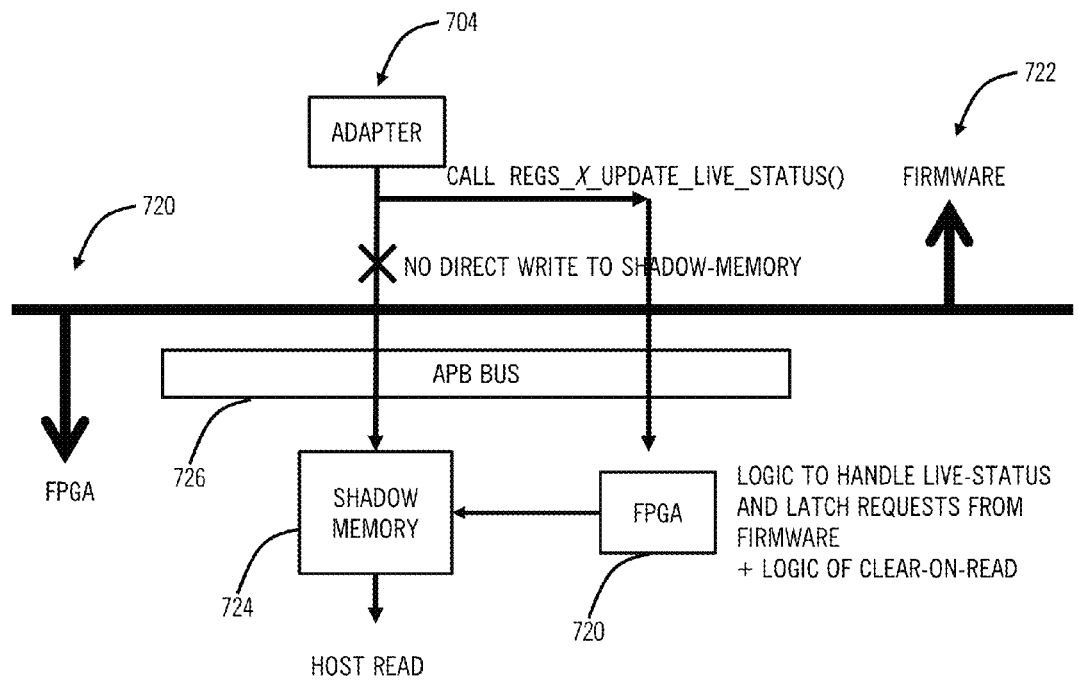
FIG. 20 is a logical diagram of alarm reporting in the adapter between the firmware and the FPGA.

Referring to FIG. 20, in an exemplary embodiment, a logical diagram illustrates alarm reporting in the adapter 704 between the firmware 722 and the FPGA 720. The adapter 704 does not directly write to the shadow memory 724. Instead, the adapter calls for updates through the FPGA 720 to update the shadow memory 724 which reads from the host 610. The FPGA 720 includes logic to handle live-status and latch requests from the firmware 722 along with logic to clear-on-read.

The interface module 600A is generally configured to perform, using the adapter 704, mapping between the two MSAs, e.g., QSFP and CFP2, and specifically mapping NVRs, module states, alarm and control pins, and the like.

Modulation Circuitry

Figure 21:
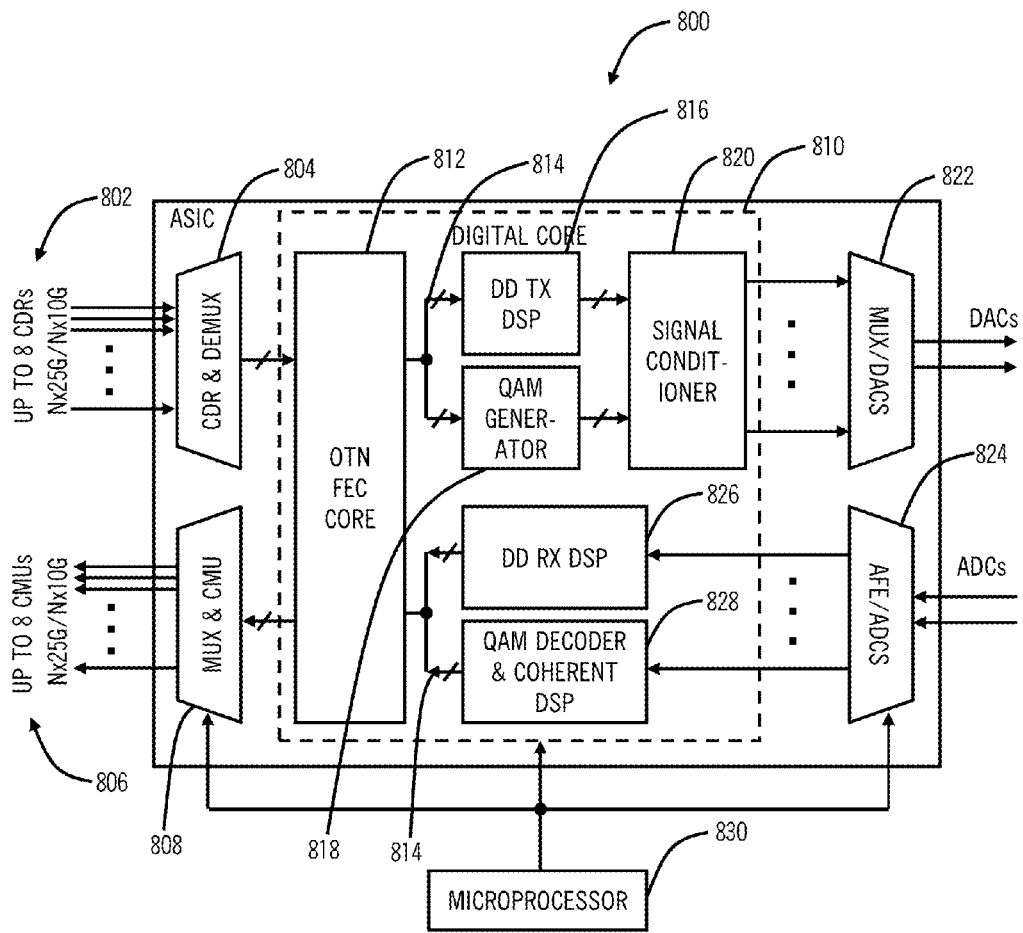
FIG. 21 is a block diagram of coherent and Pulse Amplitude Modulation (PAM) circuitry for a pluggable optical transceiver module and for a pluggable optical transceiver interface module.

Referring to FIG. 21, in an exemplary embodiment, a block diagram illustrates coherent and Pulse Amplitude Modulation (PAM) circuitry 800 for a pluggable optical transceiver module 100, 150, 200, 300, 400, 500, 602 and for a pluggable optical transceiver interface module 600. That is, the circuitry 800 is disposed within one of the pluggable optical transceiver module 100, 150, 200, 300, 400, 500, 602 and the pluggable optical transceiver interface module 600 to provide selective formatting of data for either PAM or coherent modulation. With the circuitry 800, the corresponding module can support various different applications, such as short reach with PAM and longer reach with coherent modulation. The circuitry 800 can also support additional functionality such as framing, FEC, OAM&P, etc.

The circuitry 800 includes inputs 802 to CDR and demultiplexer circuitry 804. The inputs 802 can include N×25G, N×28G, or N×10G for up to 8 CDRs (or more). Thus, the circuitry 800 can support 100G to 400G throughput. The circuitry 800 also includes outputs 806 from multiplexer and Clock Multiplier Unit (CMU) circuitry 808. The outputs 806 can also include N×25G, N×28G, or N×10G for up to 8 CMUs (or more). The inputs 802 and the outputs 806 can interface directly with the host 610 or to interface circuitry, such as the interface IC 158, the interface circuitry 630, etc.

The circuitry 800 includes a digital core 810 connected to the circuitry 804 and the circuitry 808. The digital core 810 includes circuitry for implementing various functions include framing, FEC, OAM&P, modulation formatting for PAM or coherent modulation, signal conditioning, etc. The circuitry 804, 808 is connected to an OTN/FEC core 812. The core 812 can provide framing, FEC, and OAM&P functions as described herein.

The core 812 is connected to modulation circuitry via selection circuitry 814 which is programmable to select between PAM or coherent modulation to format the data from/to the core 812. On the transmit side (top portion), the selection circuitry 814 takes an output of the core 812 which includes a framed signal with FEC and provides it to either a Direct Detection (DD) TX Digital Signal Processor (DSP) 816 or a Quadrature Amplitude Modulation (QAM) generator 818. Specifically, when the circuitry 800 is configured for PAM, the selection circuitry 814 provides the output from the core 812 to the DD TX DSP 816 and when the circuitry is configured for QAM (coherent modulation), the selection circuitry 814 provides the output from the core 812 to the QAM generator 818.

The DD TX DSP 816 is configured to format the output data from the core 812 for PAM modulation to modulate an optical transmitter section coupled to the circuitry 800. In an exemplary embodiment, the circuitry 800 can support PAM4 or PAM16; of course, other embodiments are also contemplated. PAM is signal modulation where the message information is encoded in the amplitude of a series of signal pulses. It is an analog pulse modulation scheme in which the amplitudes of a train of carrier pulses are varied according to the sample value of the message signal. Demodulation is performed by detecting the amplitude level of the carrier at every symbol period. For PAM4, the DD TX DSP 816 has four amplitude levels to transmit two bits per symbol period, and the output can be 2×56G. For PAM16, the DD TX DSP 816 has sixteen amplitude levels to transmit four bits per symbol period, and the output can be 4×28G, 1×112G, etc.

The QAM generator 818 is configured to format the output data from the core 812 for QAM modulation to modulate an optical transmitter section coupled to the circuitry 800. The QAM generator 818 can provide QAM-16 to transmit four bits per symbol period, and the output can be 4×28G, 1×112G, etc. Also, both the DD TX DSP 816 and the QAM generator 818 can also support polarization multiplexing (PM) to support transmission on dual polarizations, to allow capacity from 200G to 400G.

In an exemplary embodiment, the non-selected scheme (PAM or QAM) can have the associated circuitry disabled. The DD TX DSP 816 and the QAM generator 818 are connected to a signal conditioner 820. The signal conditioner 820 can perform signal conditioning and provide outputs to a multiplexer/DACs 822 for the output of the circuitry 800 to the optical transmitter section. The optical transmitter section can be the optical interfaces 170, the transmit optics 214, the laser array 312, the transmit optics 410, 514, the Tx/Rx module 616, etc.

On the receive side (bottom portion), inputs are received from an optical receiver section at an Analog Front End (AFE)/ADCs 824 and provided to one of a DD RX DSP 826 and a QAM decoder and coherent DSP 828. The DD RX DSP 826 performs complementary functionality as the DD TX DSP 816 to convert PAM, i.e., PAM4 or PAM16, data for input into the core 812. The QAM decoder and coherent DSP 828 also performs the complementary function as the QAM generator 818 to demodulate QAM modulated data for input to the core 812.

A microprocessor 830 can be coupled to the various components of the circuitry 800 for control thereof. For example, the microprocessor 830 can be used to select the operating mode (PAM or QAM) of the circuitry 800.

In the CFP module 150, the circuitry 800 can be the framer/FEC/OAM&P circuit 160 as well as optionally include the interface integrated circuit 158. For example, the core 812 can perform the functionality of the framer/FEC/OAM&P circuit 160. In the OIF MSA-100GLH module 200, the circuitry 800 can be the framer/FEC circuit 210, the multiplexer 212, the deframer/FEC circuit 220, and the ADC/DSP 222. In the 10×10 module 300, the circuitry 800 can include the CDR/framer/FEC/OAM&P circuit 304. In the transceiver 400, the circuitry 800 can include the circuitry 408. In the pluggable optical transceiver 500, the circuitry 800 can include the OTN processor 510. In the pluggable optical transceiver 602, the circuitry 800 can include the G.709 encoder/decoder 614. In the pluggable optical transceiver interface module 600, the circuitry 800 can be disposed in the interface circuitry 630.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An apparatus adapted to operate a pluggable optical transceiver in a plurality of modulation schemes, the apparatus comprising:
   core circuitry adapted to interface with a host device, wherein the host device is adapted to support the pluggable optical transceiver;
   direct detection modulation circuitry communicatively coupled to the core circuitry, wherein the direct detection modulation circuitry utilizes Pulse Amplitude Modulation (PAM);
   coherent modulation circuitry communicatively coupled to the core circuitry, wherein the coherent modulation circuitry utilizes Quadrature Amplitude Modulation (QAM); and
   selection circuitry adapted to operate one of the direct detection modulation circuitry and the coherent modulation circuitry based on a selection depending on an application of the pluggable optical transceiver, wherein the application is based on a reach of the pluggable optical transceiver with the PAM utilized for shorter reach than the QAM.

2. The apparatus of claim 1, wherein the PAM is one of PAM4 and PAM16 and the QAM is QAM64.

3. The apparatus of claim 1, wherein the direct detection modulation circuitry comprises a transmitter Digital Signal Processor (DSP) and a receiver DSP, and wherein the coherent modulation circuitry comprises a Quadrature Amplitude Modulation (QAM) generator and a QAM decoder and coherent DSP.

4. The apparatus of claim 1, wherein either of the direct detection modulation circuitry and the coherent modulation circuitry is configured to format signals for polarization multiplexing on dual polarizations.

5. The apparatus of claim 1, wherein the core circuitry is adapted to perform a plurality of framing; Forward Error Correction; and Operations, Administration, Maintenance, and Provisioning (OAM&P).

6. The apparatus of claim 1, further comprising:
   first interface circuitry between the core circuitry and the host device, wherein the first interface circuitry comprises:
     on a transmit side, a plurality of Clock and Data Recovery (CDR) circuits; and
     on a receive side, a plurality of Clock Multiplier Unit (CMU) circuits; and
   second interface circuitry between the direct detection modulation circuitry and the coherent modulation circuitry and optical interfaces of the pluggable optical transceiver, wherein the second interface circuitry comprises:
     on the transmit side, a plurality of digital to analog converters; and
     on the receive side, a plurality of analog to digital converters.

7. The apparatus of claim 1, wherein the pluggable optical transceiver is compliant to a Multi-Source Agreement and the apparatus is disposed within the pluggable optical transceiver.

8. The apparatus of claim 1, wherein the pluggable optical transceiver is compliant to a first Multi-Source Agreement and is operated in an interface module compliant to a second Multi-Source Agreement, and wherein the apparatus is disposed within the interface module.

9. The apparatus of claim 1, wherein the pluggable optical transceiver is one of a variant of CFP and a variant of QSFP.

10. A pluggable optical transceiver adapted to operate a plurality of modulation schemes, the pluggable optical transceiver interface comprising:
    optical interfaces;
    interface circuitry coupled a host device; and
    core circuitry coupled to the optical interfaces and the interface circuitry, wherein the core circuitry is adapted to
      interface with the host device through the interface circuitry;
      provide formatting for signals provided to and received from the optical interfaces for either direct detection modulation and coherent modulation, based on selection depending on an application of the pluggable optical transceiver, wherein the direct detection modulation is Pulse Amplitude Modulation (PAM) and the coherent modulation is Quadrature Amplitude Modulation (QAM), and wherein the application is based on a reach of the pluggable optical transceiver with the PAM utilized for shorter reach than the QAM; and
      interface with the optical interfaces with the formatted signals.

11. The pluggable optical transceiver of claim 10, wherein the PAM is one of PAM4 and PAM16 and the QAM is QAM64.

12. The pluggable optical transceiver of claim 10, wherein the direct detection modulation utilizes a transmitter Digital Signal Processor (DSP) and a receiver DSP, and wherein the coherent modulation utilizes a Quadrature Amplitude Modulation (QAM) generator and a QAM decoder and coherent DSP.

13. The pluggable optical transceiver of claim 10, wherein either of the direct detection modulation and the coherent modulation further utilizes polarization multiplexing on dual polarizations.

14. The pluggable optical transceiver of claim 10, wherein the core circuitry is further adapted to perform a plurality of framing; Forward Error Correction; and Operations, Administration, Maintenance, and Provisioning (OAM&P).

15. The pluggable optical transceiver of claim 10, wherein the interface circuitry comprises
    first interface circuitry between the core circuitry and the host device, wherein the first interface circuitry comprises:
      on a transmit side, a plurality of Clock and Data Recovery (CDR) circuits; and
      on a receive side, a plurality of Clock Multiplier Unit (CMU) circuits; and
    second interface circuitry between the core circuitry and the optical interfaces, wherein the second interface circuitry comprises:
      on the transmit side, a plurality of digital to analog converters; and
      on the receive side, a plurality of analog to digital converters.

16. The pluggable optical transceiver of claim 10, wherein the pluggable optical transceiver is compliant to a Multi-Source Agreement and the apparatus is disposed within the pluggable optical transceiver.

17. The pluggable optical transceiver of claim 10, wherein the pluggable optical transceiver is compliant to a first Multi-Source Agreement and is operated in an interface module compliant to a second Multi-Source Agreement, and wherein the apparatus is disposed within the interface module.

18. A method for operating a pluggable optical transceiver in a plurality of modulation schemes, the method comprising:
- interfacing with a host device with signals therebetween;
- formatting the signals for one of direct detection modulation and coherent modulation, based on selection depending on an application of the pluggable optical transceiver, wherein the direct detection modulation is Pulse Amplitude Modulation (PAM) and the coherent modulation is Quadrature Amplitude Modulation (QAM), and wherein the application is based on a reach of the pluggable optical transceiver with the PAM utilized for shorter reach than the QAM;
- interfacing with optical interfaces with the formatted signals from optical transmission and reception thereof, wherein the pluggable optical transceiver is compliant with a Multi-Source Agreement.

* * * * *